(12) United States Patent
Goto

(10) Patent No.: US 12,347,172 B2
(45) Date of Patent: Jul. 1, 2025

(54) IMAGE PROCESSING APPARATUS AND VEHICLE

(71) Applicant: SUBARU CORPORATION, Tokyo (JP)

(72) Inventor: Yusuke Goto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 403 days.

(21) Appl. No.: 18/079,234

(22) Filed: Dec. 12, 2022

(65) Prior Publication Data

US 2023/0196736 A1  Jun. 22, 2023

(30) Foreign Application Priority Data

Dec. 21, 2021  (JP) .................................. 2021-207407

(51) Int. Cl.
*G06V 10/75* (2022.01)
*G06V 10/40* (2022.01)
*G06V 10/774* (2022.01)
*G06V 20/58* (2022.01)

(52) U.S. Cl.
CPC ............ *G06V 10/774* (2022.01); *G06V 10/40* (2022.01); *G06V 10/759* (2022.01); *G06V 20/58* (2022.01); *G06V 2201/08* (2022.01)

(58) Field of Classification Search
CPC .... G06V 10/774; G06V 10/40; G06V 10/759; G06V 20/58; G06V 2201/08
See application file for complete search history.

(56) References Cited

U.S. PATENT DOCUMENTS

| 2013/0188018 | A1* | 7/2013 | Stevens | G06F 16/50 |
| | | | | 348/46 |
| 2019/0228537 | A1 | 7/2019 | Sekiguchi et al. | |
| 2023/0377347 | A1* | 11/2023 | Goto | G06V 20/56 |

FOREIGN PATENT DOCUMENTS

JP          2019-128350 A      8/2019

OTHER PUBLICATIONS

Ki et al, Stereo matching using generalized symmetry transform, 2002, IEEE International Workshop on Digital and Computational Video, pp. 1-8 (Year: 2002).*

(Continued)

*Primary Examiner* — Kathleen M Broughton
(74) *Attorney, Agent, or Firm* — TROUTMAN PEPPER LOCKE LLP

(57) ABSTRACT

An image processing apparatus includes an extractor and an object identifier. The extractor extracts a left feature quantity included in a left image of a stereo image and a right feature quantity included in a right image of the stereo image by executing a convolution calculation multiple times on the basis of the left and right images with securing horizontal symmetry between the left feature quantity and the right feature quantity, and executes, at the convolution calculation, a concatenation process of concatenating pixel values between the left feature quantity and the right feature quantity using a calculation process to secure the horizontal symmetry. The object identifier performs object identification of an object on the basis of the left feature quantity and the right feature quantity.

19 Claims, 21 Drawing Sheets

(56) References Cited

OTHER PUBLICATIONS

Zeng et al., TSFE-Net: Two-Stream Feature Extraction Networks for Active Stereo Matching, 2021, IEEE Digital Object Identifier, vol. 9, pp. 33954-33962. (Year: 2021).*

Kim et al., Multiscale Feature Extractors for Stereo Matching Cost Computation, 2018, IEEE Digital Object Identifier, vol. 6, pp. 27971-27983. (Year: 2018).*

* cited by examiner

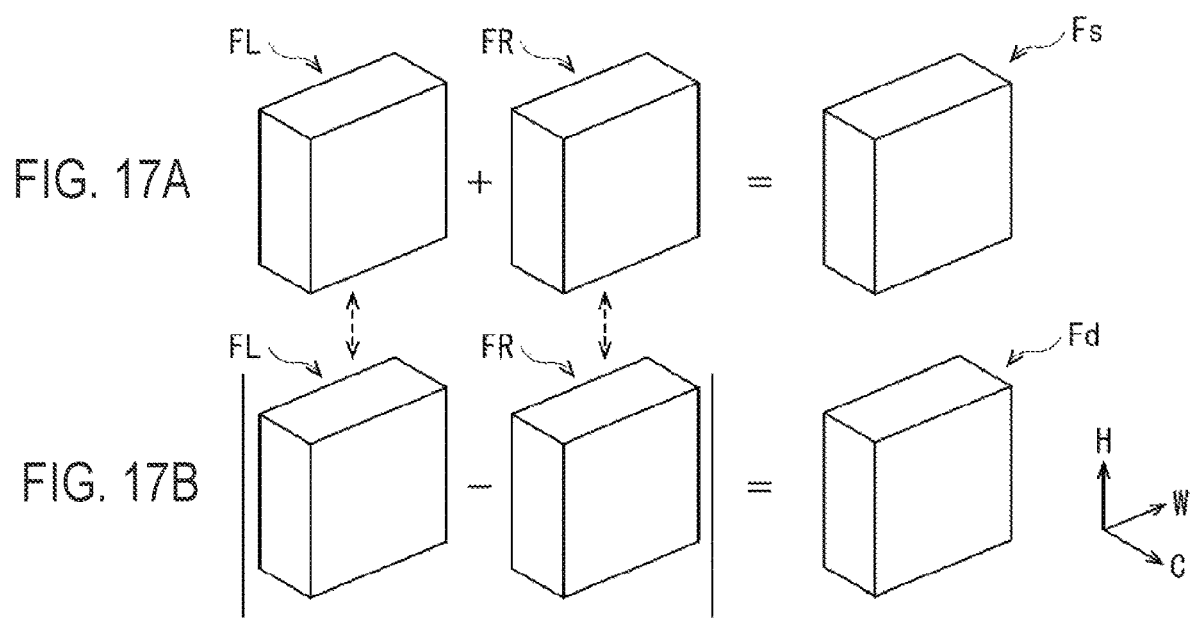
FIG. 17A
FIG. 17B
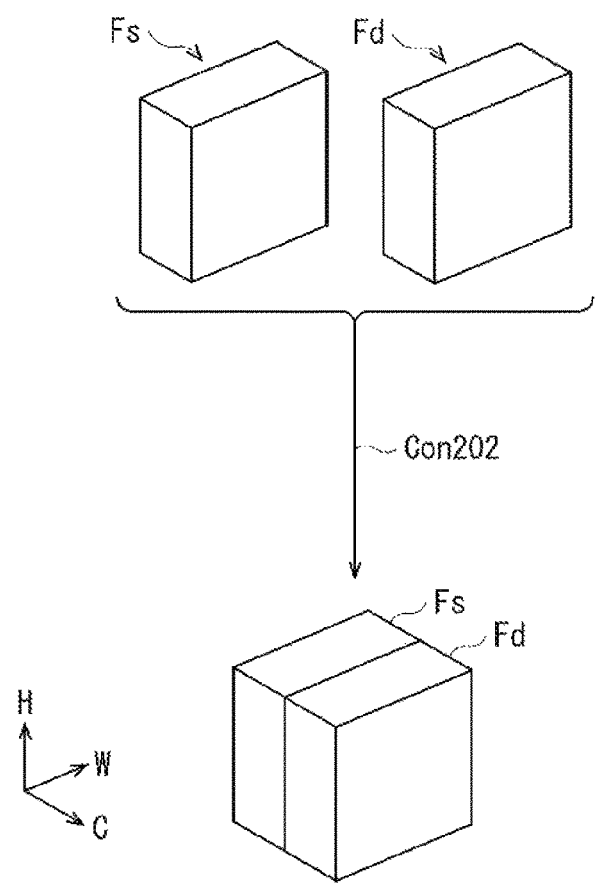
FIG. 18

MODIFICATION EXAMPLE 2

MODIFICATION EXAMPLE 2

IMAGE PROCESSING APPARATUS AND VEHICLE

CROSS-REFERENCE TO RELATED APPLICATION

The present application claims priority from Japanese Patent Application No. 2021-207407 filed on Dec. 21, 2021, the entire contents of which are hereby incorporated by reference.

BACKGROUND

The disclosure relates to an image processing apparatus that performs object recognition on the basis of a captured image, and to a vehicle including the image processing apparatus.

A captured image obtained by an imaging apparatus includes images of various objects. For example, Japanese Unexamined Patent Application Publication No. 2019-128350 discloses an image processing apparatus that performs object recognition on the basis of such a captured image.

SUMMARY

An aspect of the disclosure provides an image processing apparatus including an extractor and an object identifier. The extractor is configured to extract a left feature quantity included in a left image of a stereo image and a right feature quantity included in a right image of the stereo image by executing a convolution calculation multiple times on the basis of the left image and the right image with securing horizontal symmetry between the left feature quantity and the right feature quantity, and execute, at the convolution calculation, a concatenation process of concatenating pixel values between the left feature quantity and the right feature quantity using a calculation process to secure the horizontal symmetry. The object identifier is configured to perform object identification of an object on the basis of the left feature quantity and the right feature quantity.

An aspect of the disclosure provides a vehicle including an image processing apparatus and a vehicle controller. The image processing apparatus includes an extractor and an object identifier. The extractor is configured to extract a left feature quantity included in a left image of a stereo image and a right feature quantity included in a right image of the stereo image by executing a convolution calculation multiple times on the basis of the left image and the right image with securing horizontal symmetry between the left feature quantity and the right feature quantity, and execute, at the convolution calculation, a concatenation process of concatenating pixel values between the left feature quantity and the right feature quantity using a calculation process to secure the horizontal symmetry. The object identifier is configured to perform object identification of an object on the basis of the left feature quantity and the right feature quantity. The vehicle controller is configured to control the vehicle on the basis of a result of the object identification performed by the object identifier.

An aspect of the disclosure provides an image processing apparatus including circuitry. The circuitry is configured to extract a left feature quantity included in a left image of a stereo image and a right feature quantity included in a right image of the stereo image by executing a convolution calculation multiple times on the basis of the left image and the right image with securing horizontal symmetry between the left feature quantity and the right feature quantity, execute, at the convolution calculation, a concatenation process of concatenating pixel values between the left feature quantity and the right feature quantity using a calculation process to secure the horizontal symmetry, and identify an object on the basis of the left feature quantity and the right feature quantity.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIGS. 17A and 17B are schematic diagrams illustrating a calculation process in a concatenation process according to one example embodiment of the disclosure.

FIG. 18 is a schematic diagram illustrating the concatenation process including the calculation process illustrated in FIGS. 17A and 17B.

DETAILED DESCRIPTION

What is demanded of an image processing apparatus that performs image processing (object recognition) on the basis of, for example, a stereo image is to secure horizontal symmetry of performance (model performance).

It is desirable to provide an image processing apparatus that makes it possible to secure horizontal symmetry of performance of object recognition based on a stereo image, and a vehicle including the image processing apparatus.

Figure 1:
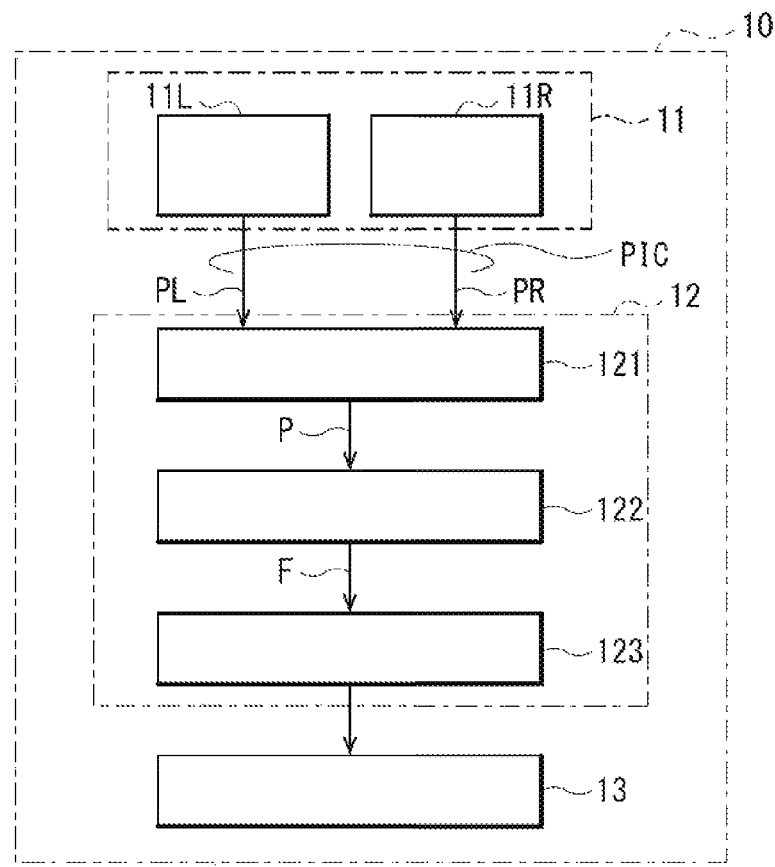
FIG. 1 is a block diagram illustrating a schematic configuration example of a vehicle according to one example embodiment of the disclosure.
Figure 2:
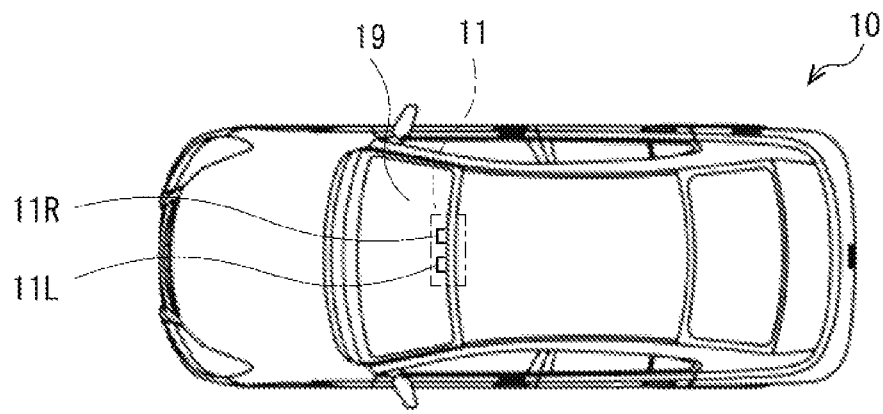
FIG. 2 is a top plan diagram schematically illustrating an outer configuration example of the vehicle illustrated in FIG. 1.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. FIG. 1 is a block diagram illustrating a schematic configuration example of a vehicle (a vehicle 10) according to an example embodiment of the disclosure. FIG. 2 is a top plan diagram schematically illustrating an outer configuration example of the vehicle 10 illustrated in FIG. 1.

As illustrated in FIG. 1, the vehicle 10 may include a stereo camera 11, an image processing apparatus 12, and a vehicle controller 13. Note that FIG. 1 omits the illustration of other components including a power source, such as an engine or a motor, of the vehicle 10. For example, the vehicle 10 may be an electrically driven vehicle such as a hybrid electric vehicle (HEV) or an electric vehicle (EV), or may be a gasoline vehicle.

As illustrated in FIG. 2, for example, the stereo camera 11 may capture images of the front view from the vehicle 10 to thereby generate paired images, e.g., a left image PL and a right image PR, having respective parallaxes. As illustrated in FIGS. 1 and 2, the stereo camera 11 may include a left camera 11L and a right camera 11R.

The left camera 11L and the right camera 11R may each include, for example, a lens and an image sensor. As illustrated in FIG. 2, for example, the left camera 11L and the right camera 11R may be disposed in the vicinity of an upper part of a windshield 19 of the vehicle 10 and spaced from each other by a predetermined distance along the width direction of the vehicle 10. The left camera 11L and the right camera 11R may perform imaging operations in synchronization with each other. For example, as illustrated in FIG. 1, the left camera 11L may generate the left image PL, and the right camera 11R may generate the right image PR. The left image PL and the right image PR may each include multiple pixel values. The left image PL and the right image PR may constitute a stereo image PIC, as illustrated in FIG. 1.

Figure 3:
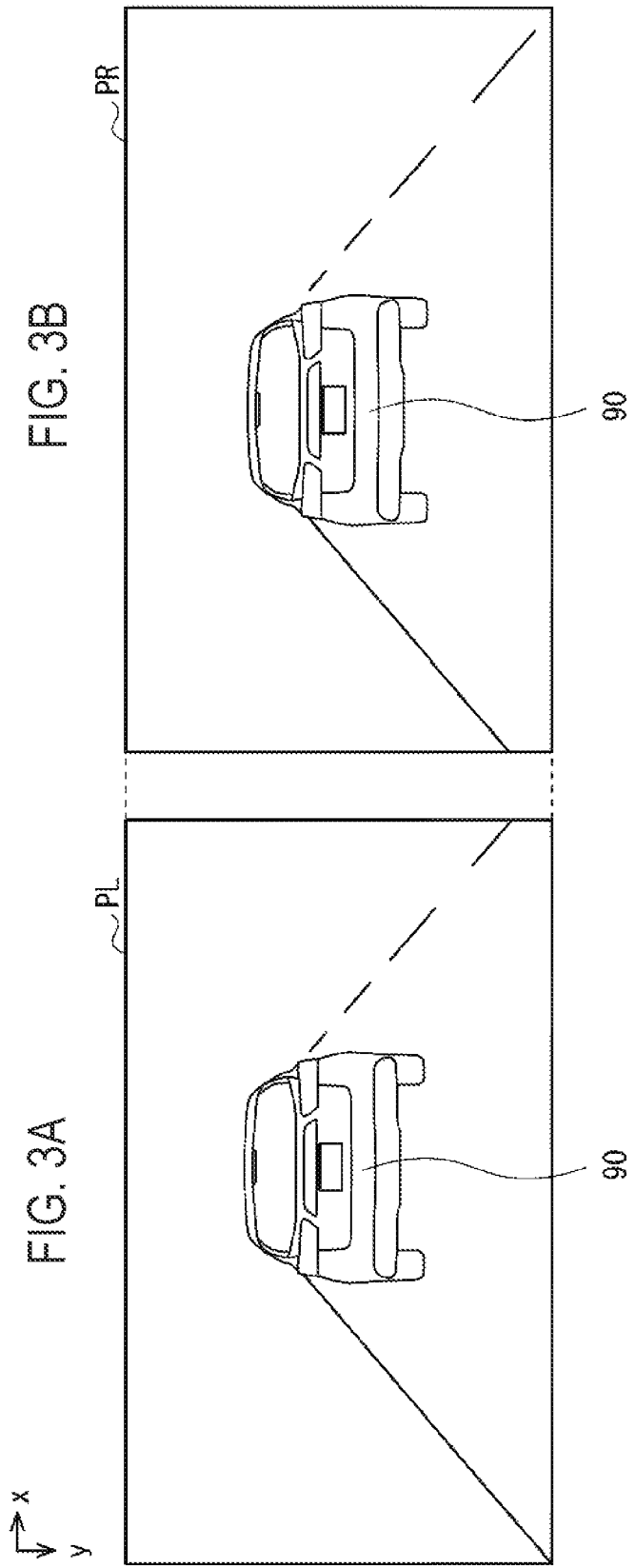
FIGS. 3A and 3B are schematic diagrams illustrating an example of a left image and a right image generated by a stereo camera illustrated in FIG. 1.

FIGS. 3A and 3B illustrate an example of the stereo image PIC. FIG. 3A illustrates an example of the left image PL, and FIG. 3B illustrates an example of the right image PR. Note that x and y in FIGS. 3A and 3B represent an x-axis and a y-axis, respectively. In this example, another vehicle (e.g., a preceding vehicle 90) is traveling ahead of the vehicle 10 on the same traveling road. The left camera 11L may capture an image of the preceding vehicle 90 to generate the left image PL. The right camera 11R may capture an image of the preceding vehicle 90 to generate the right image PR.

The stereo camera 11 may generate the stereo image PIC including the left image PL and the right image PR. The stereo camera 11 may perform the imaging operations at a predetermined frame rate, such as 60 fps, to generate a series of stereo images PIC.

The image processing apparatus 12 may perform various image processing, including a process of recognizing an object present ahead of the vehicle 10, on the basis of the stereo images PIC received from the stereo camera 11. As illustrated in FIG. 1, the image processing apparatus 12 may include an image memory 121, a feature quantity extractor 122, and an object identifier 123.

The image processing apparatus 12 may include one or more processors or central processing units (CPUs) each executing a program, and one or more memories communicably coupled to the one or more processors. The memories may each include, for example, a random-access memory (RAM) that temporarily holds processing data, and a read-only memory (ROM) that contains the program.

In one embodiment, the feature quantity extractor 122 may serve as an "extractor".

As illustrated in FIG. 1, the image memory 121 may temporarily hold the left image PL and the right image PR included in the stereo image PIC. The image memory 121 may sequentially supply the left image PL and the right image PR stored therein, as a captured image P, to the feature quantity extractor 122 (see FIG. 1).

The feature quantity extractor 122 extracts a feature quantity F included in one or more image regions R in the captured image P (the left image PL and the right image PR) read from the image memory 121 (see FIG. 1). For example, the feature quantity extractor 122 extracts a feature quantity F included in the left image PL (hereinafter referred to as a left feature quantity FL) and a feature quantity F included in the right image PR (hereinafter referred to as a right feature quantity FR) as will be described in detail later. The feature quantity F (the left feature quantity FL and the right feature quantity FR) may include pixel values of multiple pixels that are two-dimensionally arranged in a matrix, as will be described in detail later with reference to FIG. 7. Examples of the feature quantity F may include red, green, and blue (RGB) feature quantities and histograms of oriented gradients (HOG) feature quantities.

As will be described in detail later, the feature quantity extractor 122 may define the one or more image regions R described above in the captured image P and extract the feature quantity F by using a trained model such as a trained deep neural network (DNN), that is, by using machine learning. To define the image region R, the feature quantity extractor 122 may, for example, recognize an object in the captured image P and output the coordinates of the recognized object to thereby define a rectangular region as the image region R.

Figure 4:
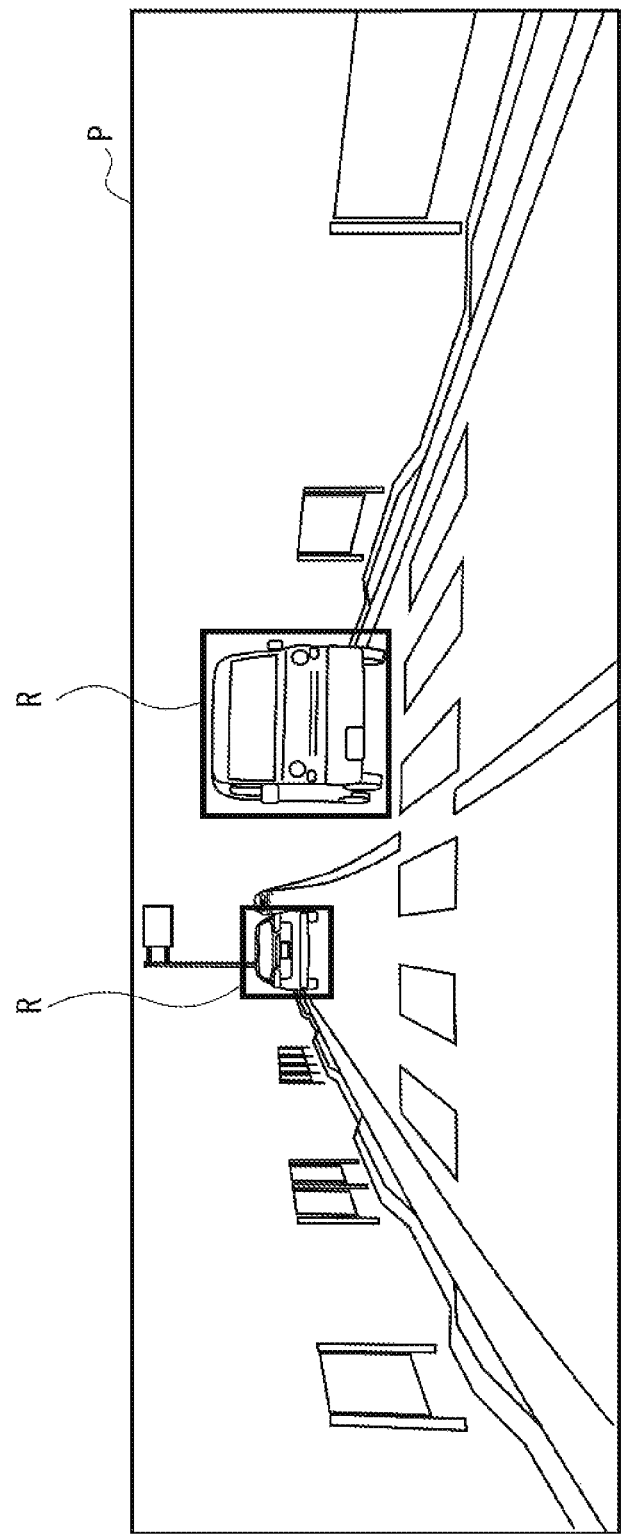
FIG. 4 is a schematic diagram illustrating an example of image regions defined in a captured image.

FIG. 4 schematically illustrates an example of the image region R. In the example illustrated in FIG. 4, two image regions R may be defined for two vehicles, respectively, in the captured image P. Although the image regions R may be defined for vehicles in this example, this is non-limiting. For example, the image regions R may be defined for other objects such as humans, guardrails, and walls.

Now, with reference to FIGS. 5 to 8, a detailed description will be given of an extraction process of the feature quantity F included in the captured image P (i.e., in the one or more image regions R) to be performed by the feature quantity extractor 122.

Figure 5:
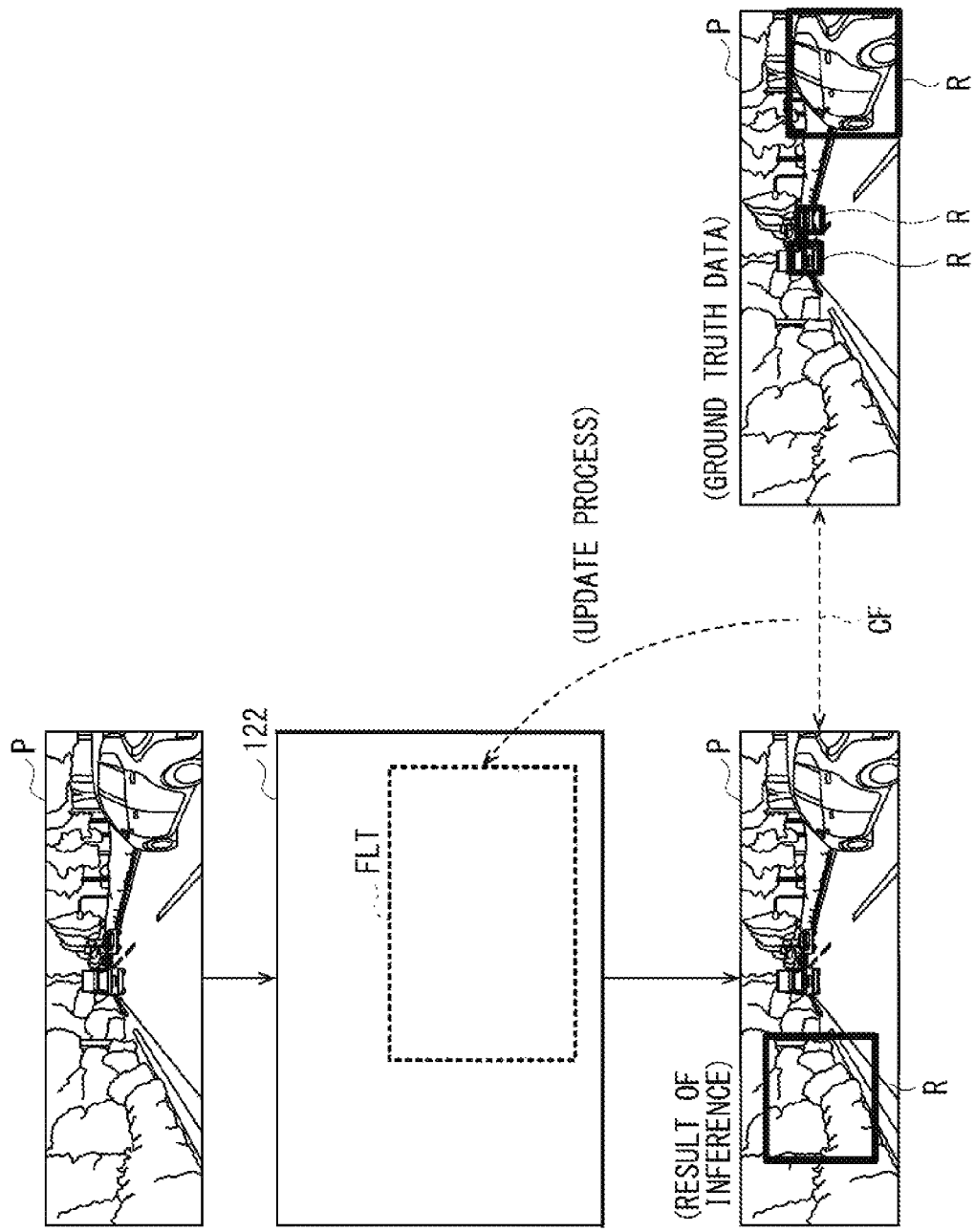
FIG. 5 is a schematic diagram describing an outline of an update process of a filter to be used in a convolution calculation.
Figure 6:
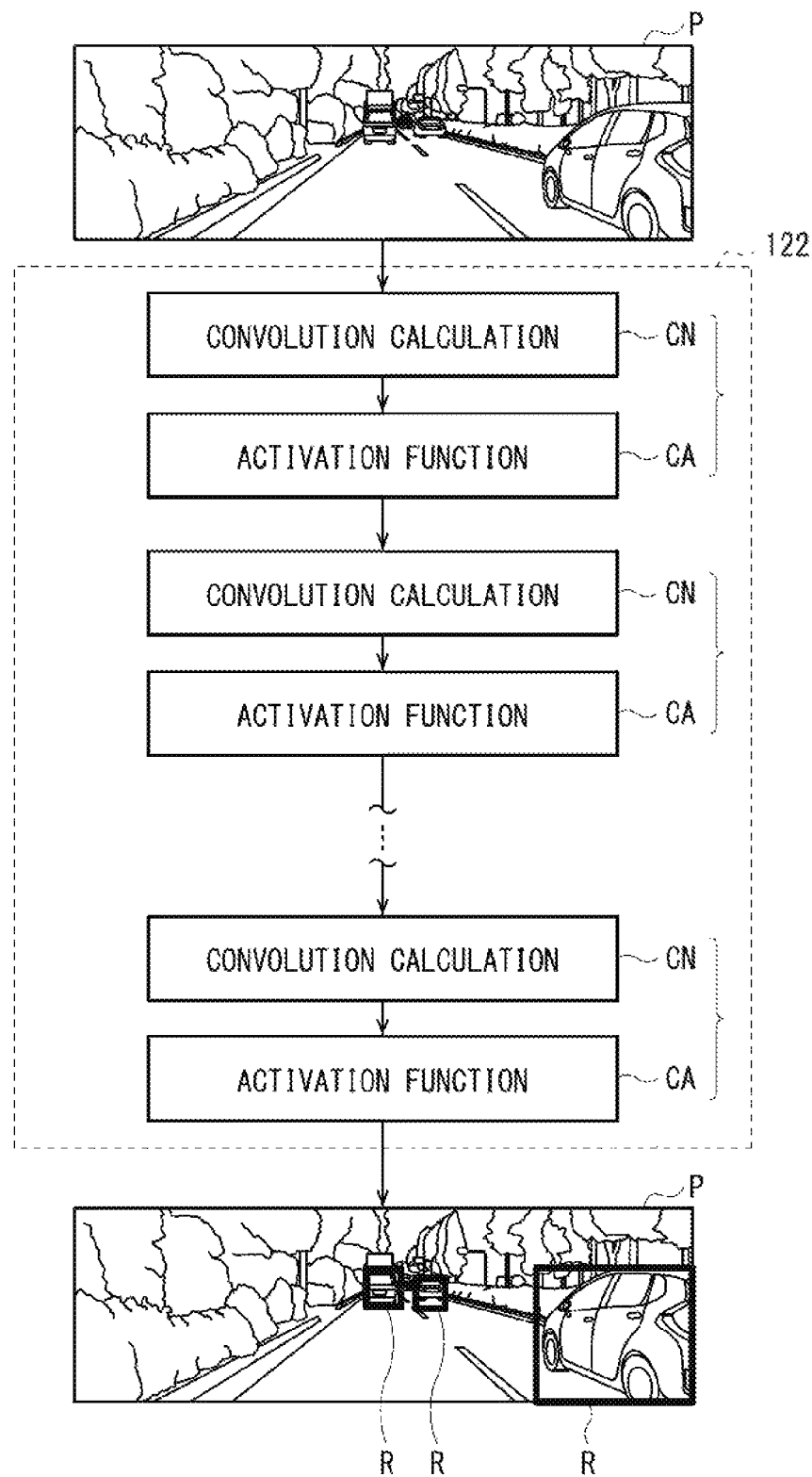
FIG. 6 is a schematic diagram illustrating an application example of the convolution calculation and an activation function at a feature quantity extractor illustrated in FIG. 1.
Figure 7:
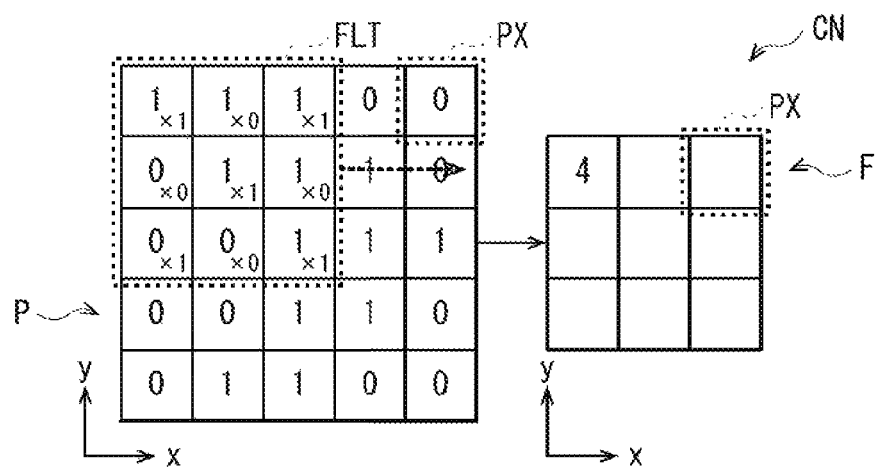
FIG. 7 is a schematic diagram illustrating an example process of the convolution calculation illustrated in FIG. 6.
Figure 8:
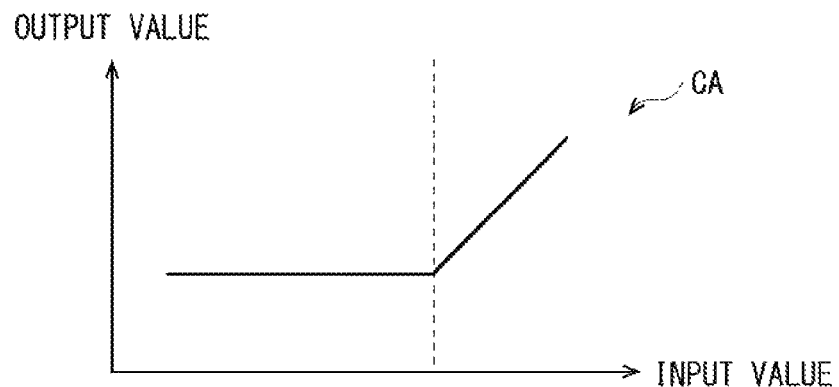
FIG. 8 is a schematic diagram illustrating a configuration example of the activation function illustrated in FIG. 6.

FIG. 5 schematically illustrates an outline of an update process of a filter FLT to be used in a convolution calculation to be described later. FIG. 6 schematically illustrates an application example of the convolution calculation and an activation function at the feature quantity extractor 122 to be described later. FIG. 7 schematically illustrates an example process of the convolution calculation illustrated in FIG. 6. FIG. 8 schematically illustrates a configuration example of the activation function illustrated in FIG. 6.

First, at the feature quantity extractor 122, as illustrated in FIG. 5, for example, calculations including the convolution calculation using the filter FLT to be described later may be performed on the received captured image P to thereby obtain a result of inference of object recognition (e.g., a result of extraction of the feature quantity F in the image region R) by machine learning. The result of inference thus obtained may be compared with ground truth data of the object recognition (see the broken-line arrow CF in FIG. 5) as needed, and an update process of a parameter of the filter FLT (i.e., each filter value to be described later) may be performed as needed to cause a difference between the result of inference and the ground truth data to be smaller. Thus, the update process of each filter value of the filter FLT may be performed every time as needed the filter FLT is updated by machine learning, and a trained model of the machine learning may be generated thereby.

In this way, instead of defining a specific processing formula like an existing rule-based development technique, a large number of pieces of training data for machine learning and a large number of pieces of ground truth data corresponding to the respective pieces of training data may be prepared to repeat the above-described update process. This makes it possible to eventually obtain an inference result that matches the ground truth data.

Thereafter, as illustrated in FIG. 6, for example, the feature quantity extractor 122 may perform multiple kinds of calculation processes based on the received captured image P (the left image PL and the right image PR) multiple times using the trained model thus obtained, thereby performing object recognition (e.g., extraction of the feature quantity F) in each image region R in the captured image P. In one example, as the multiple kinds of calculation processes, the feature quantity extractor 122 may perform a convolution calculation CN using the filter FLT and a calculation using an activation function CA alternately multiple times (see FIG. 6).

As illustrated in FIG. 7, for example, the foregoing convolution calculation CN may be performed in the following manner. First, the feature quantity extractor 122 may define a region having a predetermined size in the captured image P including multiple pixels PX that are two-dimensionally arranged in a matrix. In this example, the predetermined size may be 3 pixels by 3 pixels. Further, the feature quantity extractor 122 may perform a weighted summation of the nine pixel values in the defined region, using nine filter values in the filter FLT as weighting coefficients. In this example, the nine pixel values in the defined region may each be "0" or "1". As a result of the weighting summation, a value of the feature quantity F in the region is obtainable. The value of the feature quantity F may be 4 in this example. Note that, in the example illustrated in FIG. 7, the filter values in the filter FLT each denoted as "x0" or "x1" may be two-dimensionally arranged in a matrix of three along a row direction or an x-axis direction by three along a column direction or a y-axis direction to make the total number equal to nine. The feature quantity extractor 122 may define the regions one by one in the captured image P by shifting the last defined region by one pixel, and may perform the weighted summation using the above-described filter FLT for each of the defined regions individually to thereby calculate the value of the feature quantity F of each region one by one. The feature quantity F including the multiple pixels PX that are two-dimensionally arranged in a matrix may thus be extracted as illustrated in FIG. 7, for example. Note that the filter FLT may be separately set for each execution of the convolution calculation CN illustrated in FIG. 6, for example.

As illustrated in FIG. 8, for example, the calculation using the activation function CA may be performed in the following manner. The activation function CA illustrated in FIG. 8, for example, may be applied to an input value (i.e., a value of each pixel PX of the feature quantity F obtained by the corresponding convolution calculation CN) to obtain an output value after the application of the activation function CA. In the example of FIG. 8, the output value may be set at a fixed value such as "0" in a case where the input value is less than a predetermined value, whereas, in a case where the input value is greater than or equal to the predetermined value, the output value may be set to linearly increase in accordance with the magnitude of the input value.

The feature quantity F eventually obtained by performing the multiple kinds of calculation processes multiple times may be supplied from the feature quantity extractor 122 to the object identifier 123 (see FIG. 1).

Note that a configuration example (processing example) of the feature quantity extractor 122 will be described in detail later with reference to FIGS. 15 to 19.

The object identifier 123 identifies an object in the captured image P (i.e., each of the one or more image regions R described above) on the basis of the feature quantity F extracted by the feature quantity extractor 122. For example, in a case where the image in the image region R represents a vehicle, the feature quantity F may include the features of the vehicle; and in a case where the image in the image region R represents a human, the feature quantity F may include the features of the human. The object identifier 123 thus identifies the object in each of the image regions R on the basis of the feature quantity F.

The object identifier 123 may thereafter assign, to each of the image regions R, a category indicating what the object is. For example, in a case where the object in the image in any of the image regions R is a vehicle, the object identifier 123 may assign a category representing a vehicle to the image region R. In a case where the object in the image in any of the image regions R is a human, the object identifier 123 may assign a category representing a human to the image region R.

The vehicle controller 13 may perform various kinds of vehicle control on the vehicle 10 on the basis of the result of object identification by the object identifier 123, that is, the result of object recognition at the image processing apparatus 12 (see FIG. 1). In one example, the vehicle controller 13 may perform travel control on the vehicle 10, operation control on any of various components of the vehicle 10, or another kind of vehicle control on the basis of the result of object identification or object recognition.

Like the image processing apparatus 12, the vehicle controller 13 may include one or more processors or CPUs each executing a program, and one or more memories communicably coupled to the one or more processors. As in the image processing apparatus 12, these memories may each include, for example, a RAM that temporarily holds processing data, and a ROM that contains the program.

Operations (detailed configuration, processing, and other features of the feature quantity extractor 122), workings, and some example effects of the present example embodiment will now be described in detail in comparison with comparative examples (Comparative Examples 1 and 2).

The convolution calculations in a DNN described above typically have some issues, as described below.

First, as described above, a filter for a convolution calculation is generally provided separately for each of multiple executions of the convolution calculation. Accordingly, the number of parameters (i.e., the number of values represented by the filter values) set for each filter is very large (e.g., the order of several millions) in an entire trained model. This makes it difficult to lighten the processing model or the trained model in performing image processing or object recognition, resulting in high difficulty of, for example, small-scale hardware implementation, such as integration. To address this issue, for example, an approach such as reducing the model size itself or reducing accuracy of the convolution calculation is conceivable; however, there is a trade-off with model performance or recognition performance.

Further, it is desired that the object recognition performance be horizontally symmetric because travel environments for vehicles (i.e., whether vehicles should travel on the left side or should travel on the right side) are generally different from country to country. In convolution calculations in a typical DNN, however, the object recognition performance is horizontally asymmetric. This makes it necessary that individual evaluation works be performed upon machine learning for both of a case of the left-side travel environment and a case of the right-side travel environment, resulting in an increased number of evaluation steps.

To address such an issue, some approaches are conceivable including performing training with artificially prepared horizontally flipped images in machine learning. However, even with such an approach, there may be a case where strict horizontal symmetry is not achievable, as in Comparative Example 1 described below, for example. In such a case, the number of evaluation steps will increase eventually.

Figure 9:
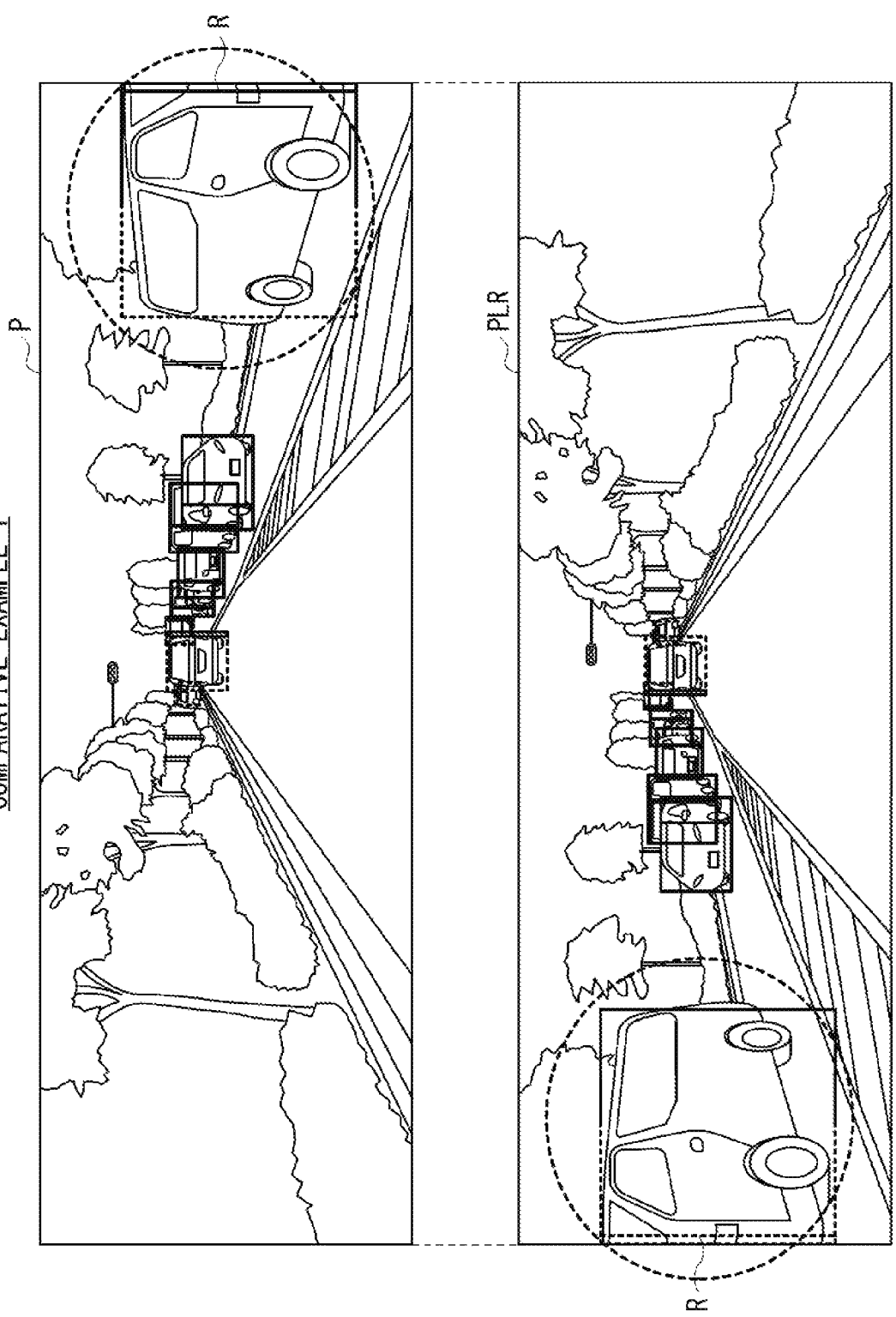
FIGS. 9A and 9B are schematic diagrams illustrating an example of results of object recognition according to one comparative example.

FIGS. 9A and 9B schematically illustrates an example of results of object recognition (object identification) according to Comparative Example 1. According to the results of object recognition in Comparative Example 1 illustrated in FIGS. 9A and 9B, in the case where the travel environment for vehicles in the original captured image P was the left-side travel environment (see FIG. 9A), the result of object recognition on an artificially prepared horizontally flipped image PLR (FIG. 9B) was as described below.

In FIGS. 9A and 9B, the image region R that was defined at the time of the object recognition is illustrated partly in solid lines and partly in broken lines. The solid-line portion of the image region R corresponds to a front portion of a recognized vehicle, and the broken-line portion of the image region R corresponds to a rear portion of the recognized vehicle.

According to the result of object recognition on the original captured image P illustrated in FIG. 9A, the front portion and the rear portion of the recognized vehicle were accurately recognized, as seen in the image region R encircled in a broken line, for example. In contrast, according to the result of object recognition on the horizontally flipped image PLR illustrated in FIG. 9B, the object recognition was partly inaccurate, unlike the case with the original captured image P. To be more specific, as seen in the image region R encircled in a broken line in FIG. 9B, for example, the front portion and the rear portion of the recognized vehicle were reversed. It is thus apparent that the object recognition performance was not horizontally symmetric in the case of Comparative Example 1 illustrated in FIGS. 9A and 9B.

Further, what is demanded of the image processing apparatus that performs image processing (object recognition) on the basis of, for example, the stereo image PIC (the left image PL and the right image PR) is to secure horizontal symmetry of performance (model performance) described below.

Figure 10:
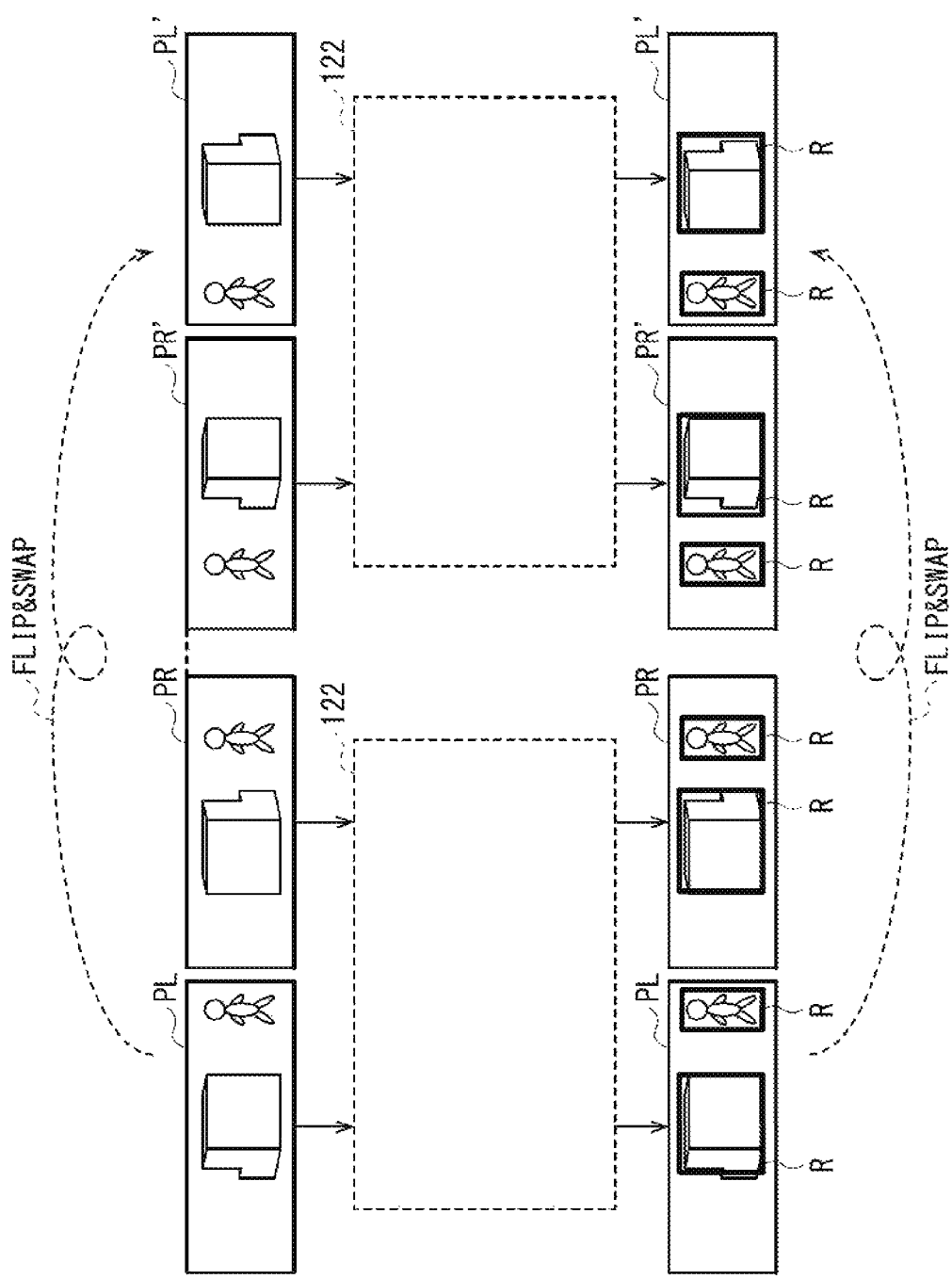
FIG. 10 is a schematic diagram illustrating an example of results of object recognition based on a stereo image according to one example embodiment of the disclosure.

That is, it is desired that the left image PL and the right image PR included in the stereo image PIC be as in the following example of results of object recognition based on the stereo image PIC according to the example embodiment illustrated in FIG. 10, for example. For example, even in a case where FLIP (horizontally flipping) and SWAP (horizontal swapping between left and right inputs) are performed on each of the left image PL and the right image PR to be sent to the feature quantity extractor 122 as indicated by a broken-line arrow in FIG. 10, it is desired that the horizontal symmetry be completely secured in the results of inference outputted from the feature quantity extractor 122. That is, in a case where SWAP is performed on each of a flipped image PL', which is obtained by FLIP of the left image PL, and a flipped image PR', which is obtained by FLIP of the right image PR, it is desired that FLIP and SWAP be also performed on the results of inference of the flipped images PL' and PR'. Note that FLIP and SWAP may be hereinafter collectively referred to as horizontally flipping processing as needed.

Figure 11:
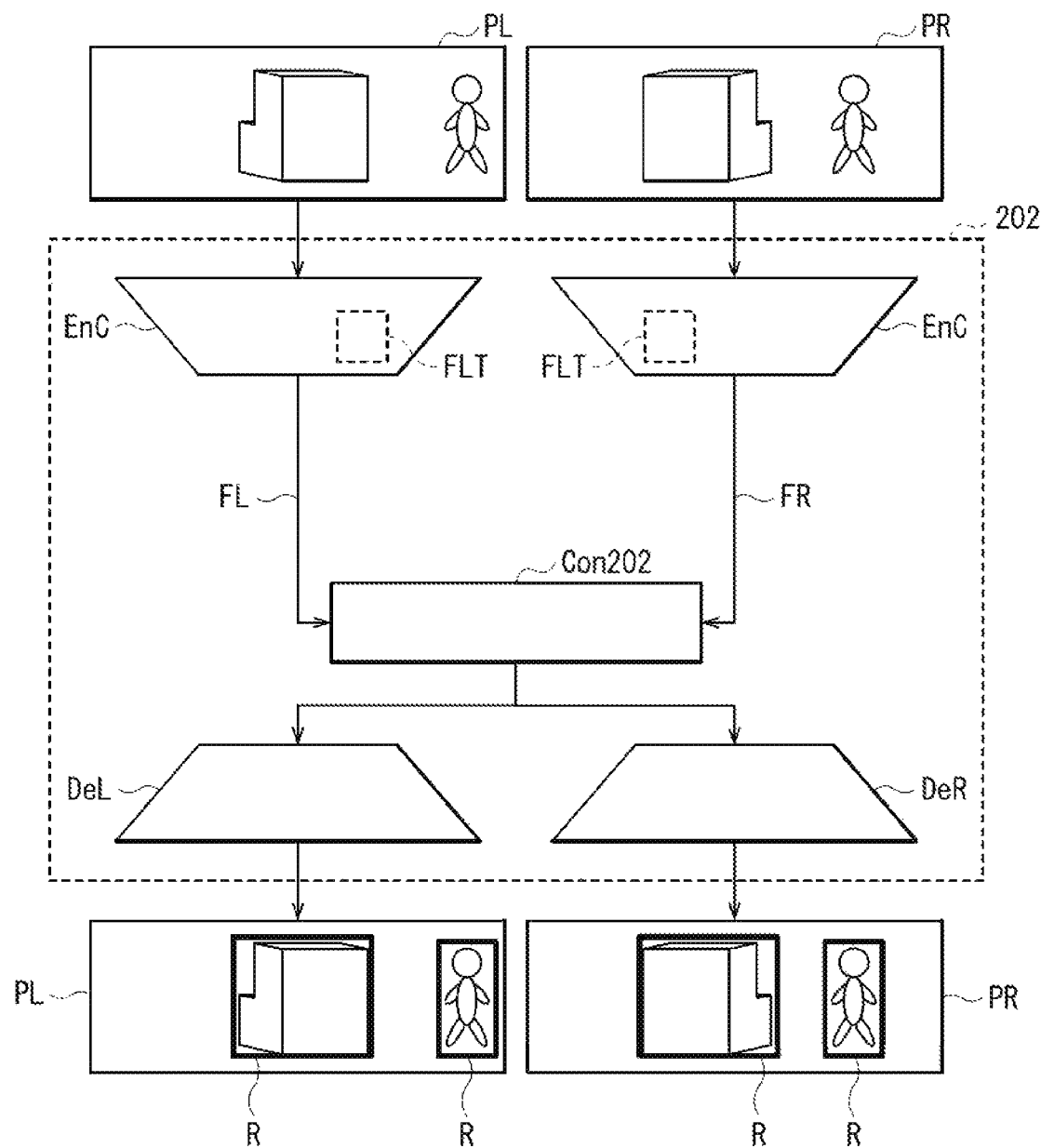
FIG. 11 is a schematic diagram illustrating a configuration example of a feature quantity extractor according to one comparative example.
Figure 12:
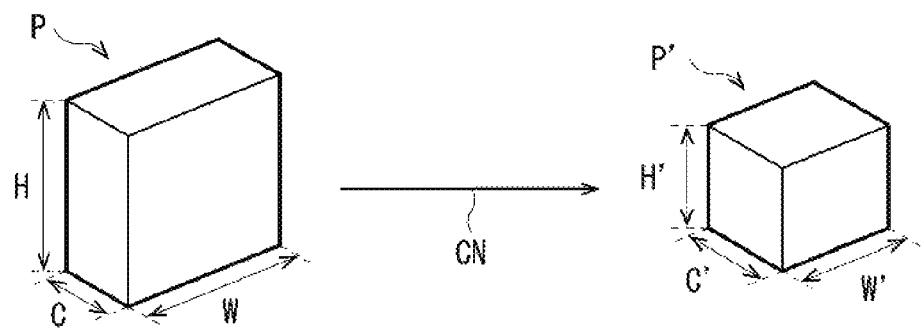
FIG. 12 is a schematic diagram illustrating image conversion in the convolution calculation.
Figure 13:
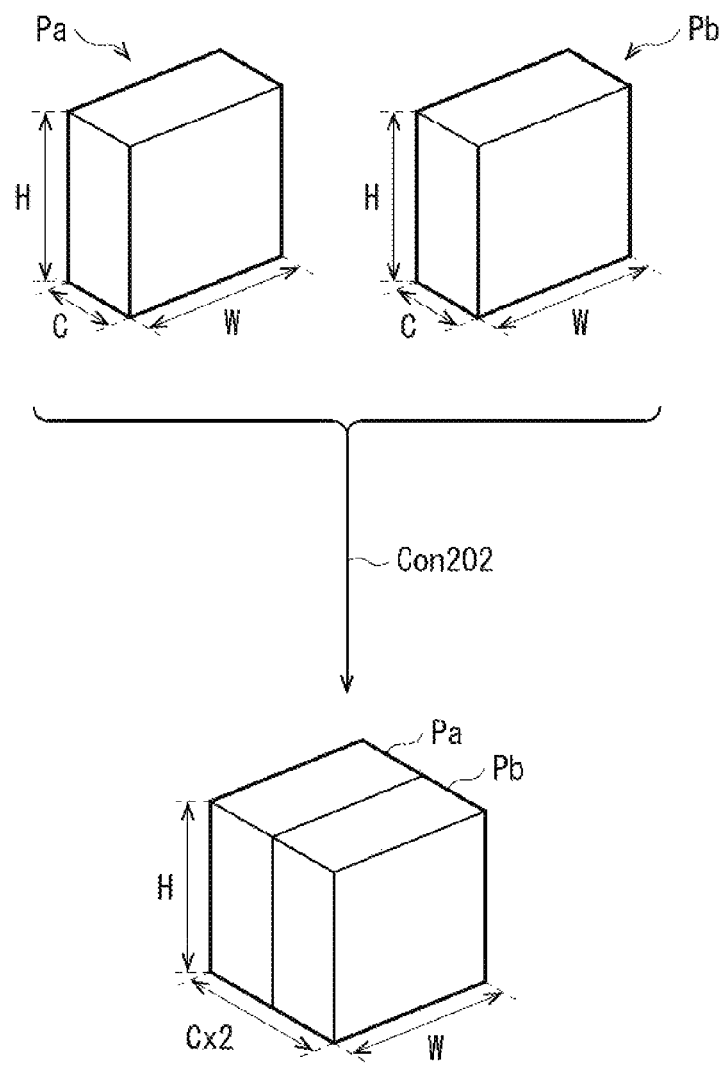
FIG. 13 is a schematic diagram illustrating a typical concatenation process.
Figure 14:
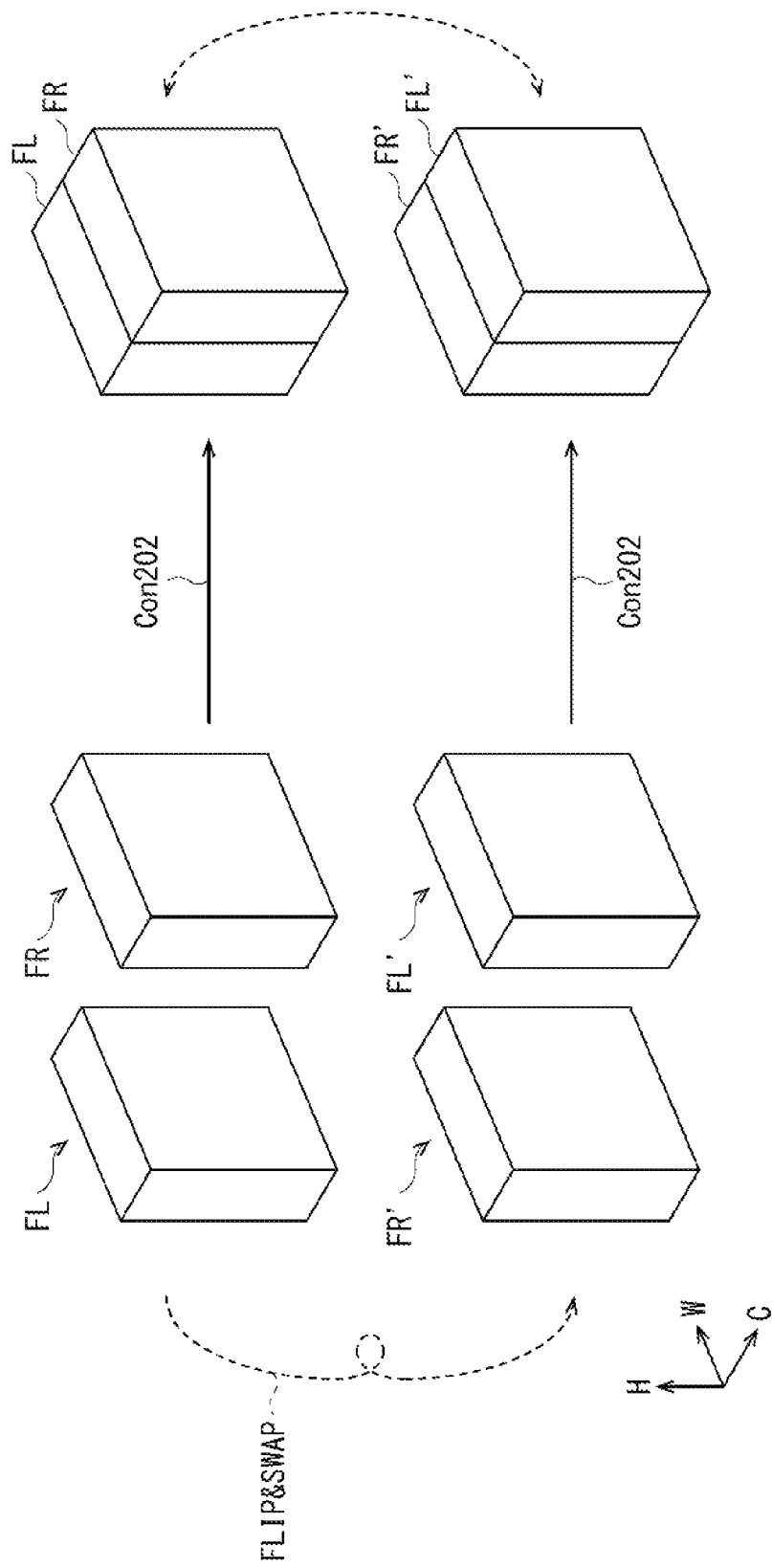
FIG. 14 is a schematic diagram illustrating an example of a concatenation process according to one comparative example.

FIG. 11 schematically illustrates a configuration example (processing example) of a feature quantity extractor 202 according to Comparative Example 2. FIG. 12 schematically illustrates image conversion at the time of the convolution calculation described above. FIG. 13 schematically illustrates an existing typical concatenation process. FIG. 14 schematically illustrates an example of a concatenation process according to Comparative Example 2 illustrated in FIG. 11.

As illustrated in FIG. 11, the feature quantity extractor 202 according to Comparative Example 2 includes two encoders EnC, a concatenation processing unit Con 202, and two decoders DeL and DeR. The two encoders Enc are identical to each other and provided for the left image PL and the right image PR, respectively. The concatenation processing unit Con 202 performs the concatenation process to be described later.

The encoder EnC for the left image PL extracts the left feature quantity FL from the left image PL using the filter FLT described above. The encoder EnC for the right image PR extracts the right feature quantity FR from the right image PR using the filter FLT described above. The concatenation processing unit Con 202 performs the typical concatenation process of concatenating pixels between the left feature quantity FL and the right feature quantity FR. On the basis of the results outputted from the concatenation processing unit Con 202 (the results of the concatenation process between the left feature quantity FL and the right feature quantity FR), the decoder DeL outputs the result of inference of the left image PL, and the decoder DeR outputs the result of inference of the right image PR.

The typical concatenation process will now be described with reference to FIGS. 12 and 13.

First, image conversion illustrated in, for example, FIG. 12 is performed in each of the convolution calculations CN described above. For example, in the example illustrated in FIG. 12, image conversion from the captured image P having a width W, a height H, and a channel C to a captured image P' having a width W', a height H', and a channel C' is performed in each of the convolution calculations CN. Accordingly, the captured image generally differs in size between before and after the image processing.

For example, a plurality of images having the same shape (size) is concatenated with each other along a channel direction as illustrated in FIG. 13 by a process generally referred to as a concatenation process. In the example illustrated in FIG. 13, for example, the concatenation processing unit Con 202 described above performs an existing typical concatenation process to concatenate pixel values of a captured image Pa and pixel values of a captured image Pb with each other along the direction of the channel C.

Accordingly, in a case where the typical concatenation process was applied to the left feature quantity FL and the right feature quantity FR by the concatenation processing unit Con 202 according to Comparative Example 2 illustrated in FIG. 11, the following results were obtained, as illustrated in FIG. 14, for example. In FIG. 14, the pixel values before the horizontally flipping processing along a lateral direction (i.e., along the width W) are represented as the left feature quantity FL and the right feature quantity FR, and the pixel values after the horizontally flipping processing along the lateral direction (i.e., along the width W) are represented as a left feature quantity FL' and a right feature quantity FR', for convenience. The way of representing the pixel values may also be applied to the other drawings (FIGS. 17 to 19) to be described later.

In a case where FLIP and SWAP described above were performed on the left feature quantity FL and the right feature quantity FR in Comparative Example 2 illustrated in FIG. 14, the following results were obtained through the typical concatenation process performed by the concatenation processing unit Con 202 on the basis of the left feature quantity FL and the right feature quantity FR, as compared with the left feature quantity FL' and the right feature quantity FR' obtained after the horizontally flipping processing. That is, the results of the typical concatenation process performed by the concatenation processing unit Con 202 on the basis of the original left feature quantity FL and the original right feature quantity FR and the results of the typical concatenation process performed by the concatenation processing unit Con 202 on the basis of the left feature quantity FL' and the original right feature quantity FR' were not horizontally flipped from each other along the direction of the width W (see a broken-line arrow in FIG. 14).

Accordingly, it is difficult for Comparative Example 2 to secure horizontal symmetry of performance (model performance) in the image processing (object recognition) based on the stereo image PIC (the left image PL and the right image PR).

To address such an issue, the feature quantity extractor 122 having a configuration described below is provided in the example embodiment, instead of the feature quantity extractor 202 of Comparative Example 2 described above. In addition, a concatenation process to secure the horizontal symmetry is performed by a concatenation processing unit Con in the example embodiment, instead of the typical concatenation process performed by the concatenation processing unit Con 202 described above.

Figure 15:
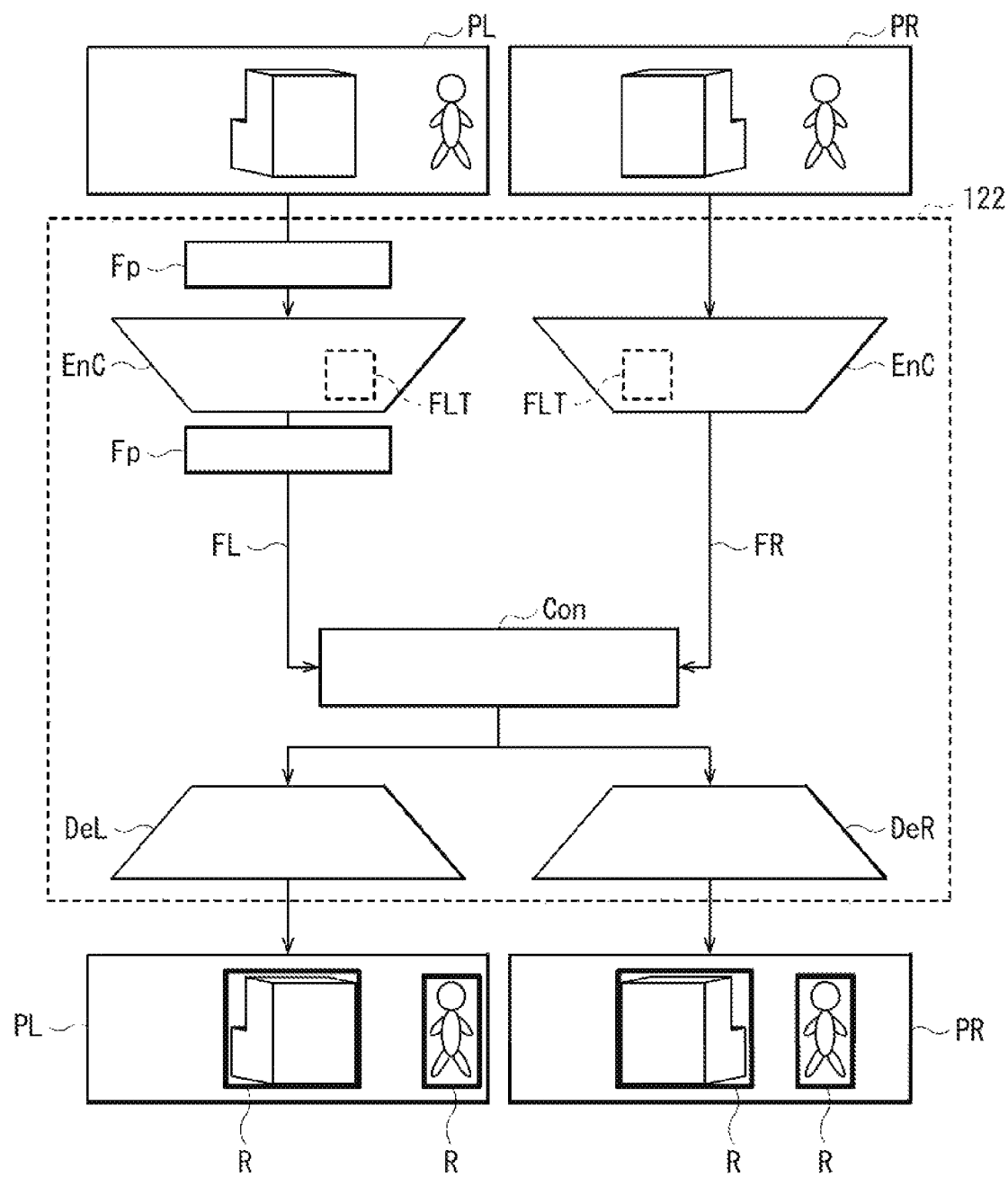
FIG. 15 is a schematic diagram illustrating a configuration example of a feature quantity extractor according to one example embodiment of the disclosure.
Figure 16:
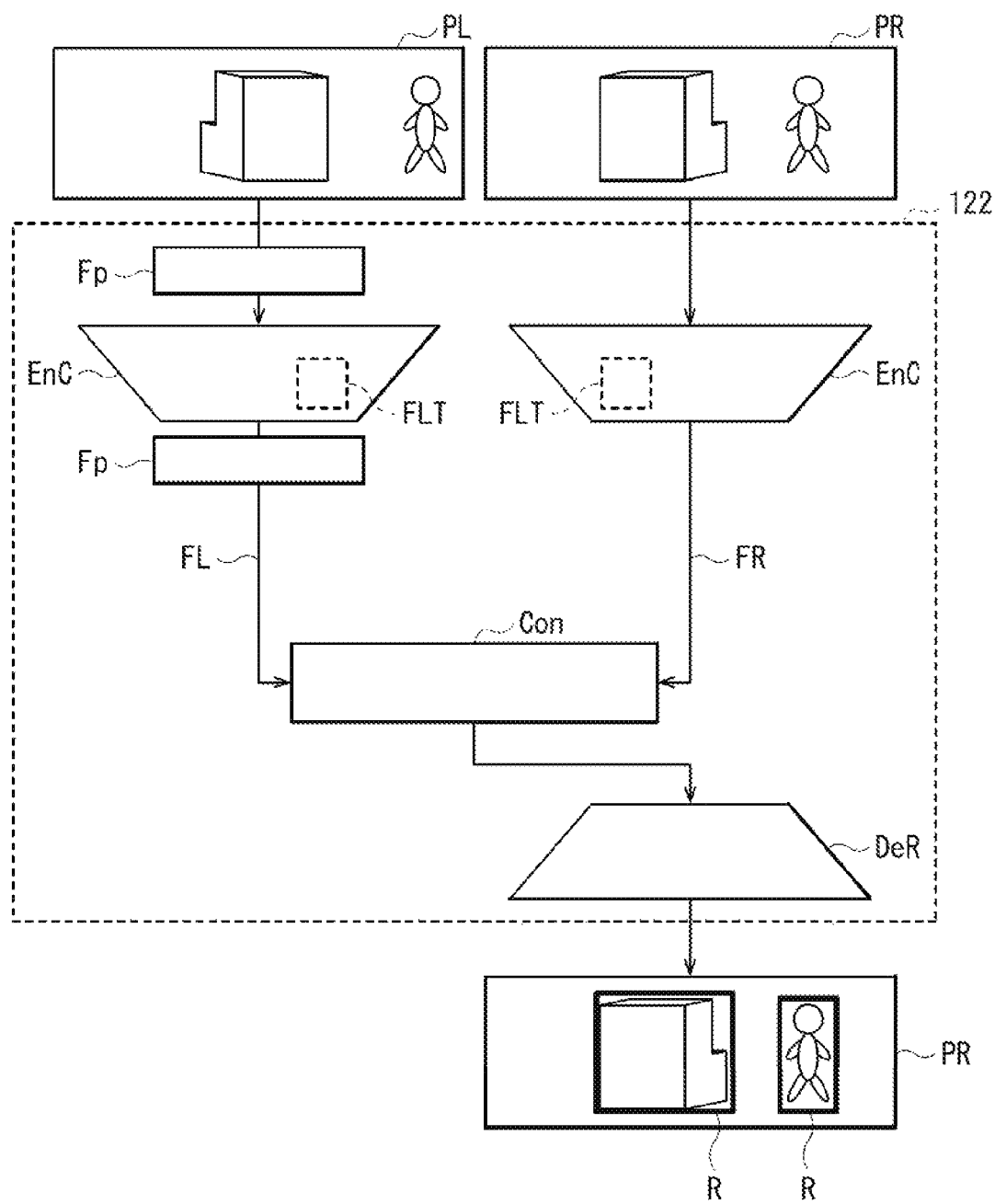
FIG. 16 is a schematic diagram illustrating another configuration example of the feature quantity extractor according to one example embodiment of the disclosure.
Figure 19:
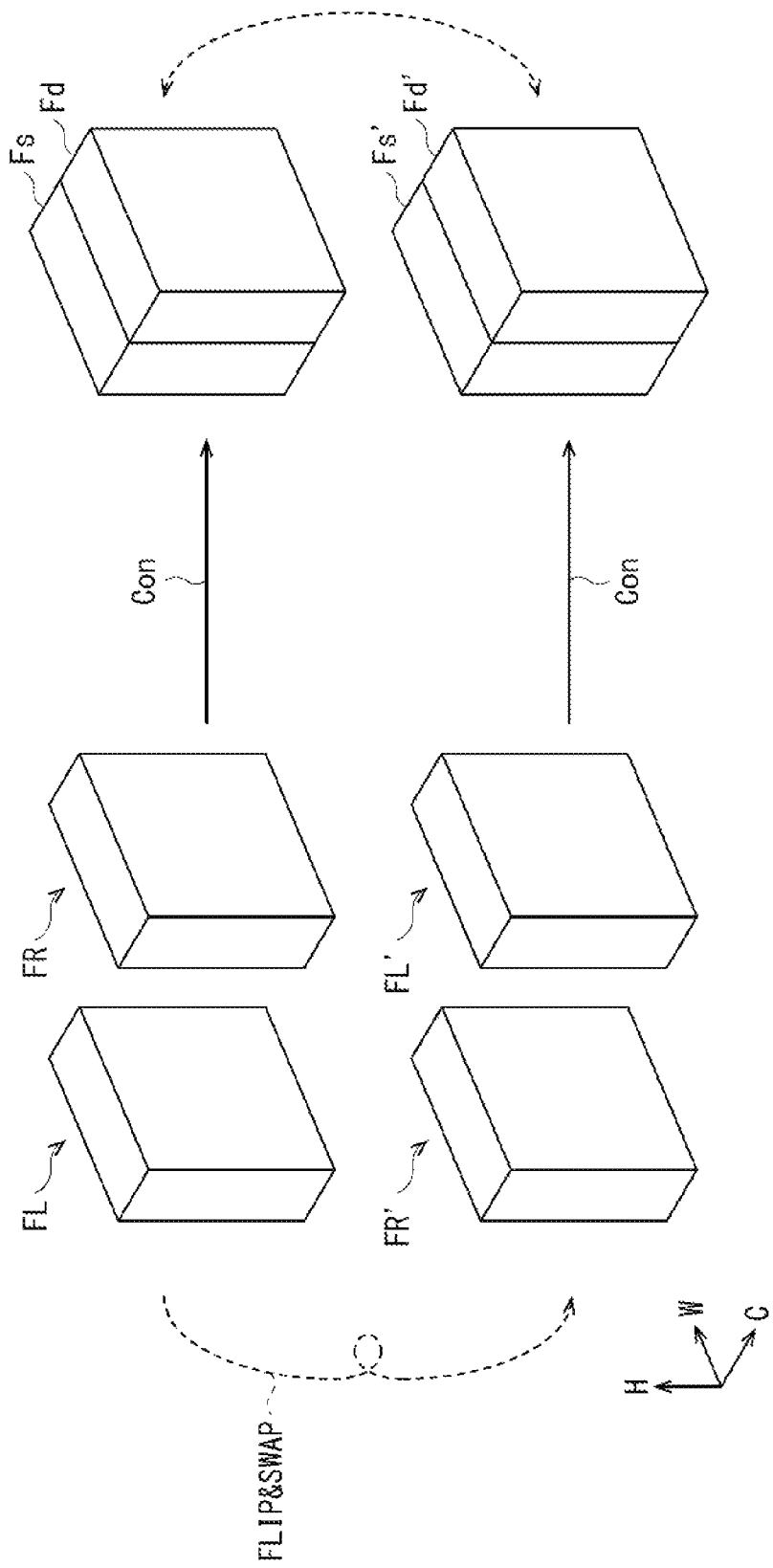
FIG. 19 is a schematic diagram illustrating an example of the concatenation process according to one example embodiment of the disclosure.

FIGS. 15 and 16 each schematically illustrate a configuration example (a processing example) of the feature quantity extractor 122 according to the example embodiment. FIGS. 17A and 17B schematically illustrates a calculation process in the concatenation process according to the example embodiment, i.e., the concatenation process to be performed by the concatenation processing unit Con to be described later. FIG. 18 schematically illustrates the concatenation process including the calculation process illustrated in FIGS. 17A and 17B. FIG. 19 schematically illustrates an example of the concatenation process according to the example embodiment.

In the configuration example of the feature quantity extractor 122 illustrated in FIG. 15, horizontally flipping processing units Fp that horizontally flip pixel values may be additionally and respectively provided upstream and downstream of the encoder EnC for the left image PL, and the concatenation processing unit Con may be provided instead of the concatenation processing unit Con 202, as compared with the feature quantity extractor 202 according to Comparative Example 2 illustrated in FIG. 11. In another configuration example of the feature quantity extractor 122 illustrated in FIG. 16, the decoder DeL for the left image PL may be omitted or may not be provided, as compared with the configuration example of the feature quantity extractor 122 illustrated in FIG. 15.

Alternatively, in these configuration examples illustrated in FIGS. 15 and 16, the horizontally flipping processing units Fp may be respectively provided upstream and downstream of the encoder EnC for the right image PR, instead of upstream and downstream of the encoder EnC for the left image PL.

Accordingly, the feature quantity extractor 122 according to the example embodiment performs the process of horizontally flipping the pixel values of one of the left image PL and the right image PR before and after the encoder EnC performs the process of extracting the feature quantity F. Accordingly, it is possible to secure horizontal symmetry between the left feature quantity FL and the right feature quantity FR.

Further, unlike the concatenation processing unit Con 202 of Comparative Example 2 described above, the concatenation processing unit Con of the example embodiment executes a concatenation process of concatenating pixel values between the left feature quantity FL and the right feature quantity FR using, for example, a calculation process to secure the horizontal symmetry described below.

First, in the calculation process, an added image Fs may be calculated as illustrated in FIG. 17A, and a difference image Fd may be calculated as illustrated in FIG. 17B. For example, as illustrated in FIG. 17A, the added image Fs may be an image corresponding to a sum total value as a resultant of addition of the pixel values between the left feature quantity FL and the right feature quantity FR. In contrast, as illustrated in FIG. 17B, the difference image Fd may be an image corresponding to an absolute value of the difference in the pixel values between the left feature quantity FL and the right feature quantity FR. Note that, in order to avoid an error in the magnitude or the absolute value, the added image Fs may actually have a value divided by $\sqrt{2}(=2^{1/2})$ as represented by Expression (1), and the difference image Fd may actually have a value divided by $\sqrt{2}(=2^{1/2})$ as represented by Expression (2).

$$Fs=(FL+FR)/\sqrt{2} \qquad \text{Expression (1)}$$

$$Fd=|FL-FR|/\sqrt{2} \qquad \text{Expression (2)}$$

Thereafter, in the calculation process, as illustrated in FIG. 18, for example, a concatenation process of concatenating pixel values may be performed between the pixel values of the added image Fs thus obtained (the sum total value as a resultant of addition of the pixel values between the left feature quantity FL and the right feature quantity FR) and the pixel values of the difference image Fd thus obtained (the absolute value of the difference in the pixel values between the left feature quantity FL and the right feature quantity FR). In other words, in the concatenation process performed by the concatenation processing unit Con of the example embodiment, the typical concatenation process described above (i.e., the concatenation process performed by the concatenation processing unit Con 202) may be performed on the added image Fs and the difference image Fd.

Unlike the feature quantity extractor 202 of Comparative Example 2 described above, the feature quantity extractor 122 of the example embodiment may perform the following operations.

For example, in a case where FLIP and SWAP described above are performed on the left feature quantity FL and the right feature quantity FR as illustrated in FIG. 19, the following results may be obtained through the concatenation process performed by the concatenation processing unit Con on the basis of the left feature quantity FL and the right feature quantity FR, as compared with the left feature quantity FL' and the right feature quantity FR' obtained after the horizontally flipping processing. That is, the results of the concatenation process performed by the concatenation processing unit Con on the basis of the original left feature quantity FL and the original right feature quantity FR and the results of the concatenation process performed by the concatenation processing unit Con on the basis of the left feature quantity FL' and the original right feature quantity FR' are horizontally flipped from each other along the direction of the width W (see a broken-line arrow in FIG. 19).

Accordingly, unlike in Comparative Example 2, it is possible for the example embodiment to secure horizontal symmetry of performance (model performance) in the image processing (object recognition) based on the stereo image PIC (the left image PL and the right image PR).

Further, according to the example embodiment, horizontal symmetry may be secured between the results of the object identification (object recognition) performed by the object identifier 123. For example, horizontal symmetry may be secured between the results of object identification performed by the object identifier 123 while the vehicle 10 is traveling on the left-side travel environment and the results of object identification performed by the object identifier 123 while the vehicle 10 is traveling on the right-side travel environment.

According to the example embodiment described above, the left feature quantity FL and the right feature quantity FR are extracted from the left image PL and the right image PR, respectively, by executing the convolution calculation multiple times on the basis of the stereo image PIC (the left image PL and the right image PR) with securing horizontal symmetry between the left feature quantity FL and the right feature quantity FR. In addition, at the convolution calculation, the concatenation process of concatenating the pixel values between the left feature quantity FL and the right feature quantity FR is executed using the above-described calculation process to secure the horizontal symmetry.

Accordingly, in the example embodiment described above, horizontal symmetry is secured in the object identification (object recognition) based on the extracted feature quantity F (the left feature quantity FL and the right feature quantity FR). As a result, in the example embodiment, it is possible to secure horizontal symmetry of performance in image processing (object recognition) based on the stereo image PIC.

Further, according to the example embodiment described above, the calculation process to secure the horizontal symmetry may be the concatenation process of concatenating the pixel values of the added image Fs (the sum total value as a resultant of addition of the pixel values between the left feature quantity FL and the right feature quantity FR) and the pixel values of the difference image Fd (the absolute value of the difference in pixel values between the left feature quantity FL and the right feature quantity FR). Thus, it is possible to easily secure the horizontal symmetry described above by using the concatenation process based on the added image Fs and the difference image Fd.

Further, according to the example embodiment, the horizontally flipping processing of the pixel values is performed on the basis of one of the left image PL and the right image PR before and after the process of extracting the feature quantity F. In other words, the horizontally flipping processing units Fp may be provided upstream and downstream of the encoders EnC. Owing to such horizontally flipping processing performed before and after the process of extracting the feature quantity F, the horizontal symmetry is secured between the left feature quantity FL and the right feature quantity FR. Thus, it is possible to lighten the processing model or the trained model in performing image processing or object recognition, as compared with the case of Modification Example 1 to be described later, for example.

In addition, according to the example embodiment, the image processing apparatus 12 may be mountable on the vehicle 10. Further, as described above, the horizontal symmetry may be secured between the results of the object identification performed by the object identifier 123 while the vehicle 10 is traveling in the left-side travel environment and the results of the object identification performed by the object identifier 123 while the vehicle 10 is traveling in the right-side travel environment for the vehicle 10. Thus, the horizontal symmetry of the object identification performance is secured in both of the left-side travel environment and the right-side travel environment. Accordingly it is possible to improve convenience and standardize evaluation works in machine learning. This results in a reduction of the number of steps in the evaluation.

Described in detail below is Inventive Example of the foregoing example embodiment, and the description thereof is made in comparison with Comparative Example 2 described above.

Figure 20:
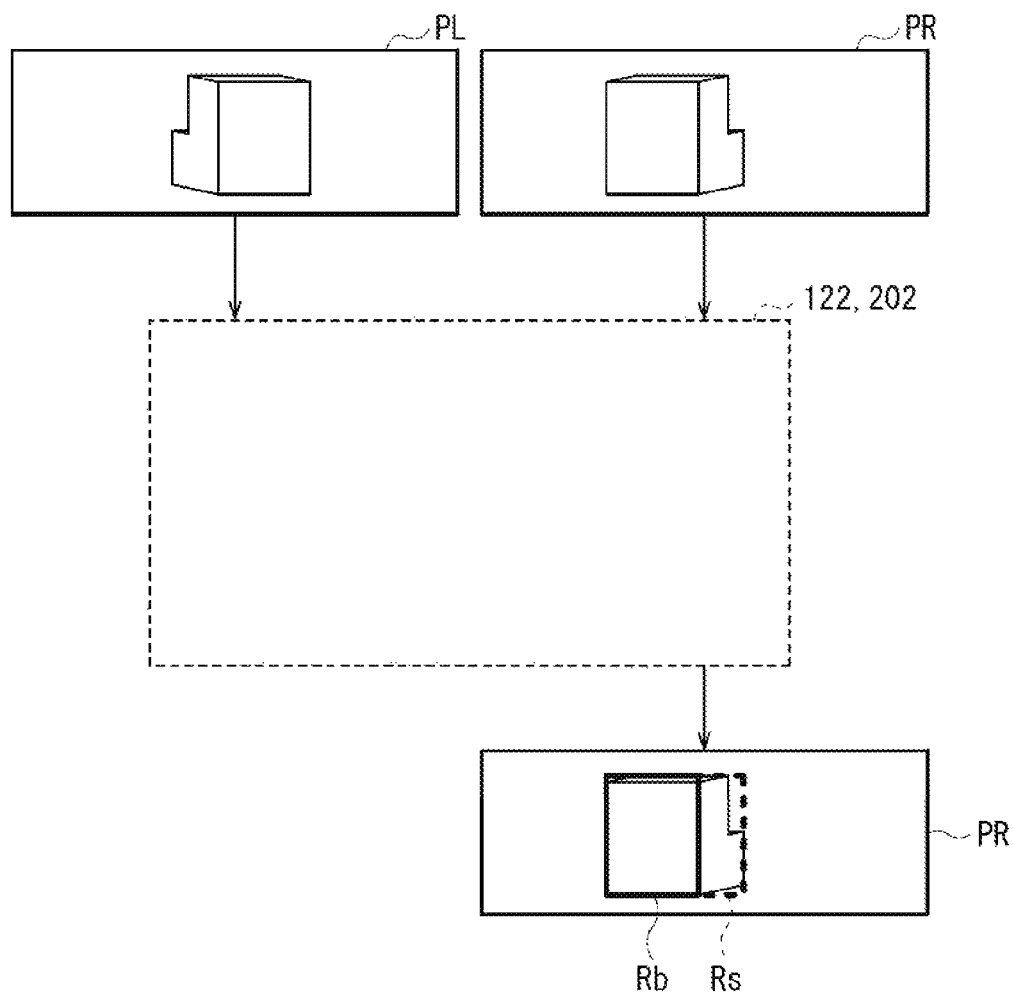
FIG. 20 is a schematic diagram illustrating object recognition according to one inventive example and one comparative example.
Figure 21:
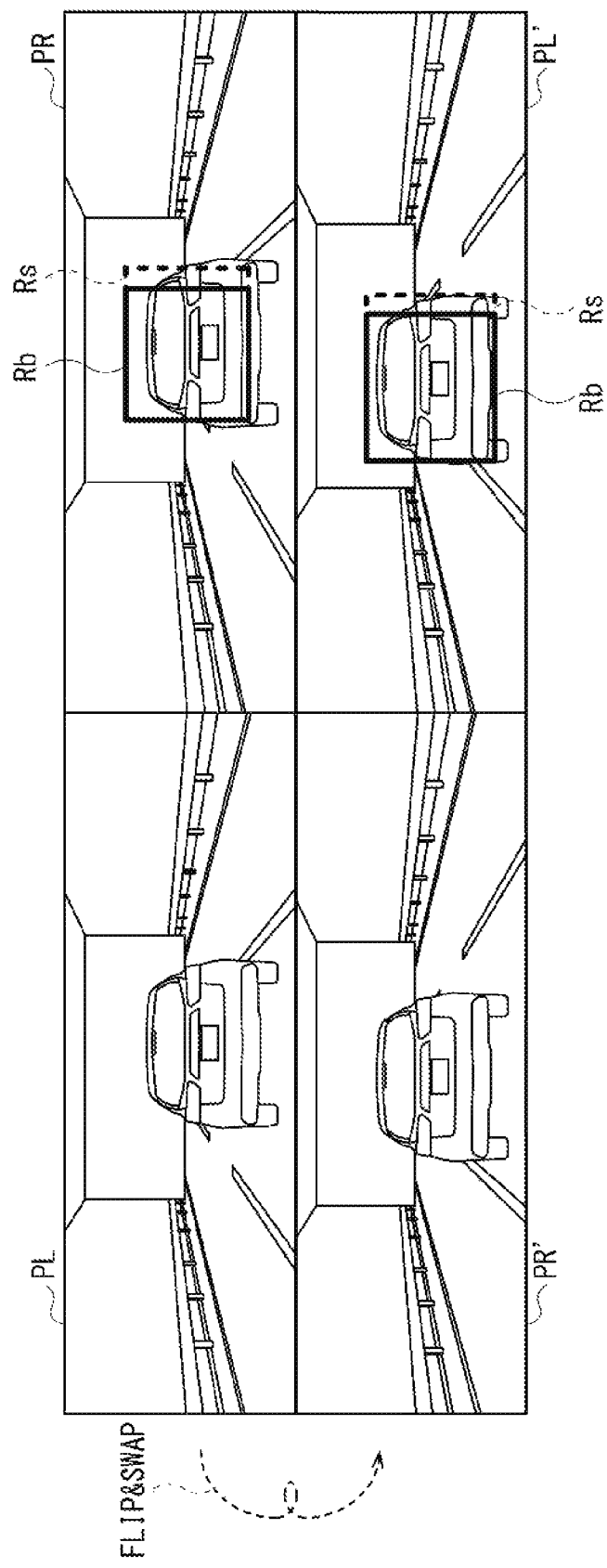
FIG. 21 is a schematic diagram illustrating an example of results of the object recognition according to one comparative example.
Figure 22:
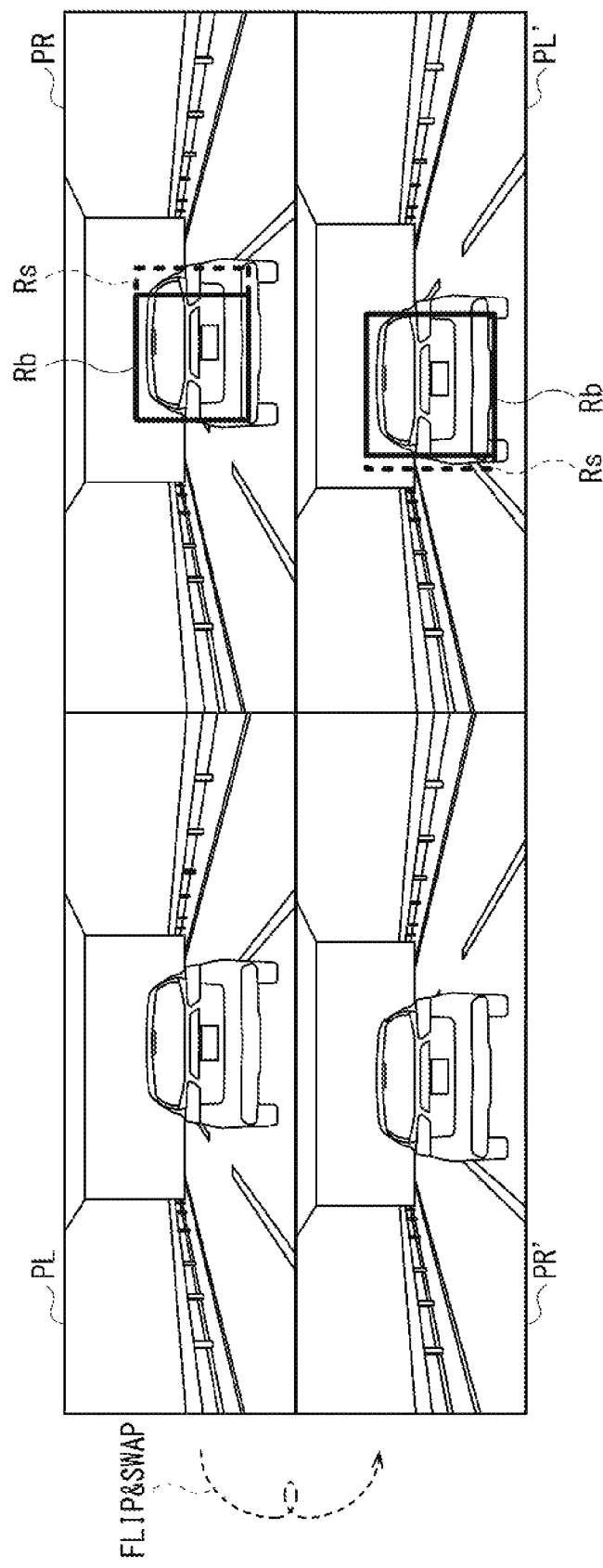
FIG. 22 is a schematic diagram illustrating an example of results of the object recognition according to one inventive example.

FIG. 20 schematically illustrates object recognition according to Inventive Example and object recognition according to Comparative Example 2. FIG. 21 schematically illustrates an example of results of the object recognition according to Comparative Example 2. FIG. 22 schematically illustrates an example of results of the object recognition according to Inventive Example.

The feature quantity extractor 122 according to Inventive Example had the above-described configuration illustrated in FIG. 16, and the feature quantity extractor 202 according to Comparative Example 2 had the above-described configuration illustrated in FIG. 11. In Inventive Example and Comparative Example 2, the extraction of the feature quantity and the object recognition based on the above-described stereo image PIC (the left image PL and the right image PR) were performed on a detection target which was a preceding vehicle traveling ahead of the vehicle 10.

The results of inference of the object recognition were obtained only from vehicle positions in the right image PR, such as a rear image region Rb and a side image region Rs of the image regions R, as illustrated in FIGS. 20 to 22. In a favorable environment in which even a monocular DNN is available, the difference between Inventive Example and Comparative Example is difficult to distinguish. Thus, Inventive Example and Comparative Example 2 were conducted in a rainy condition that tends to cause a large amount of noises in one of the stereo image (e.g., the right image PR).

First, in Comparative Example illustrated in FIG. 21, the result (defect) of object recognition in the side image region Rs (hereinafter side recognition) was the same between before and after FLIP and SWAP. For example, in Comparative Example 2, a defect or error of the side recognition was observed on the right side of the preceding vehicle both before and after FLIP and SWAP. Note that, if the horizontal symmetry of performance was secured in the object recognition, the defect in the side image region Rs should have been horizontally flipped in the flipped images PL' and PR' in accordance with horizontally flipping of the input images (i.e., the left image PL and the right image PR).

In contrast, in Inventive Example illustrated in FIG. 22, the result (defect) of side recognition was horizontally flipped between before and after FLIP and SWAP, unlike in Comparative Example 2. That is, in Inventive Example, the defect in the side image region Rs was horizontally flipped in the flipped images PL' and PR' in accordance with horizontally flipping of the input images (i.e., the left image PL and the right image PR), as described above.

Accordingly, in Inventive Example illustrated in FIG. 22, it was actually confirmed that the horizontal symmetry of performance was secured in the object recognition (of a vehicle) on the basis of the stereo image PIC, as described above, unlike in Comparative Example 2. Note that the foregoing example embodiments of Inventive Example and Comparative Example 2 are mere examples, and evaluation results (results of object recognition) similar to those of the foregoing example embodiments of Inventive Example and Comparative Example 2 were obtained also in other example embodiments.

Modification Examples (Modification Examples 1 to 3) of the foregoing example embodiments will now be described. Note that, in the following description, elements having substantially the same configuration are denoted with the same reference numerals to avoid any redundant description.

In the foregoing example embodiments, the horizontally flipping processing units Fp may be respectively provided upstream and downstream of the same encoders EnC for the left image PL and the right image PR. However, in Modification Example 1, different encoders may be provided for the left image PL and the right image PR, respectively. For example, a dedicated encoder EnL may be provided for the left image PL, and a dedicated encoder EnR may be provided for the right image PR.

Figure 23:
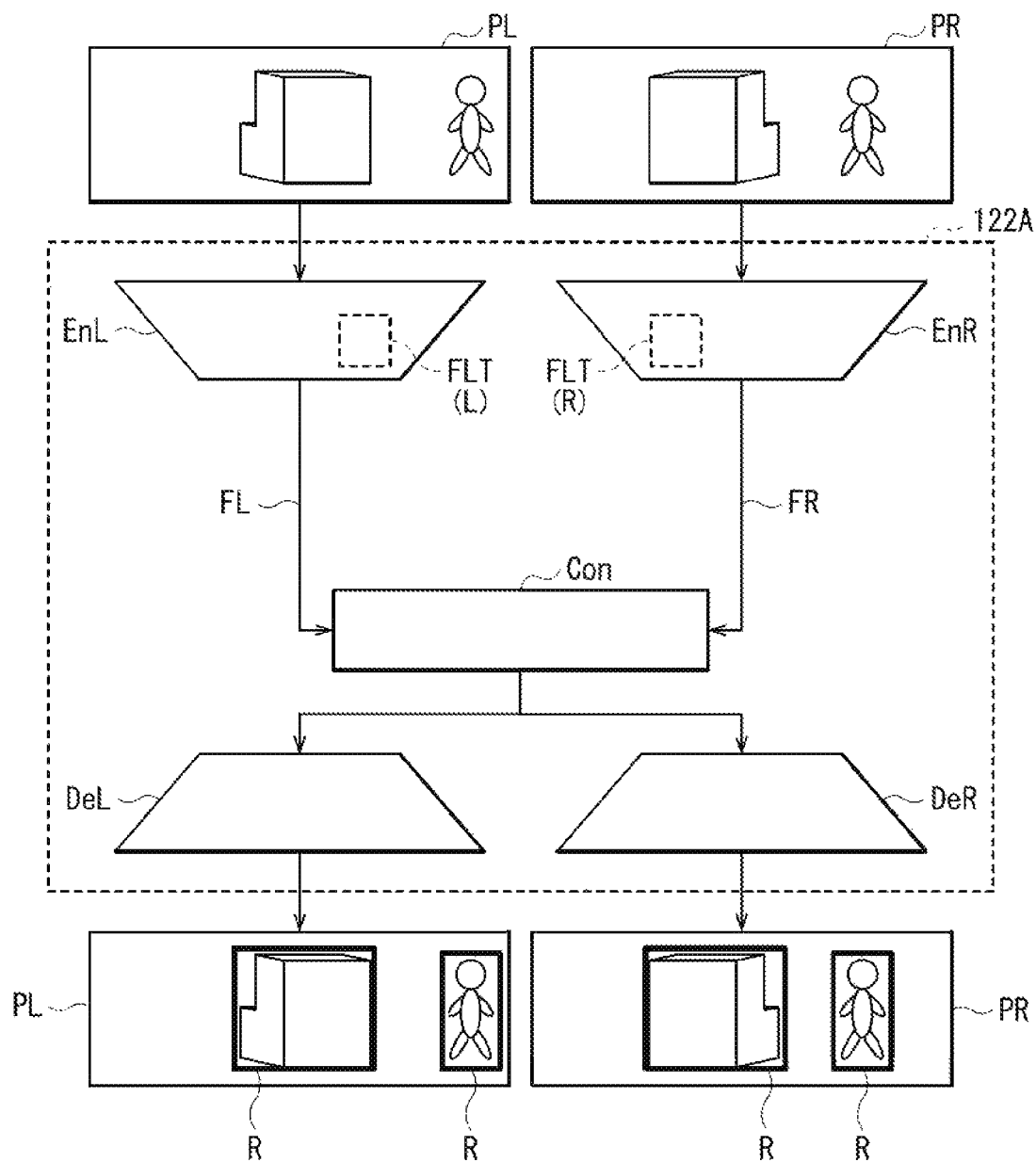
FIG. 23 is a schematic diagram illustrating a configuration example of a feature quantity extractor according to one modification example.

FIG. 23 schematically illustrates a configuration example (a processing example) of a feature quantity extractor 122A according to Modification Example 1. The feature quantity extractor 122A may not include (or may omit) the two horizontally flipping processing units Fp respectively provided upstream and downstream of the encoders EnC, and may include the dedicated encoder EnL and the dedicated encoder EnR instead of the same encoders EnC, as compared with the feature quantity extractor 122 of the example embodiments illustrated in FIGS. 15 and 16.

For example, as illustrated in FIG. 23, the encoder EnL may be dedicated to the left image PL and include, as the filter FLT described above, a filter FLT(L) dedicated to the left image PL. The encoder EnR may be dedicated to the right image PR and include, as the filter FLT described above, a filter FLT(R) dedicated to the right image PR.

Having such a configuration, the feature quantity extractor 122A makes it possible to secure the horizontal symmetry in the left feature quantity FL and the right feature quantity FR, like the feature quantity extractor 122 of the foregoing example embodiment.

Also in Modification Example 1 described above, effects similar to those of the foregoing example embodiments are obtainable. That is, it is possible to secure horizontal symmetry of performance in the image processing (object recognition) based on the stereo image PIC.

In the foregoing example embodiments, the horizontally flipping processing units Fp may be respectively provided upstream and downstream of the same encoders EnC for the left image PL and the right image PR. However, in Modification Example 2, multiple filter values Vf of the filters (filters FLT2 to be described later) of the same encoders EnC for the left image PL and the right image PR may be set at values that are horizontally symmetric.

Figure 24:
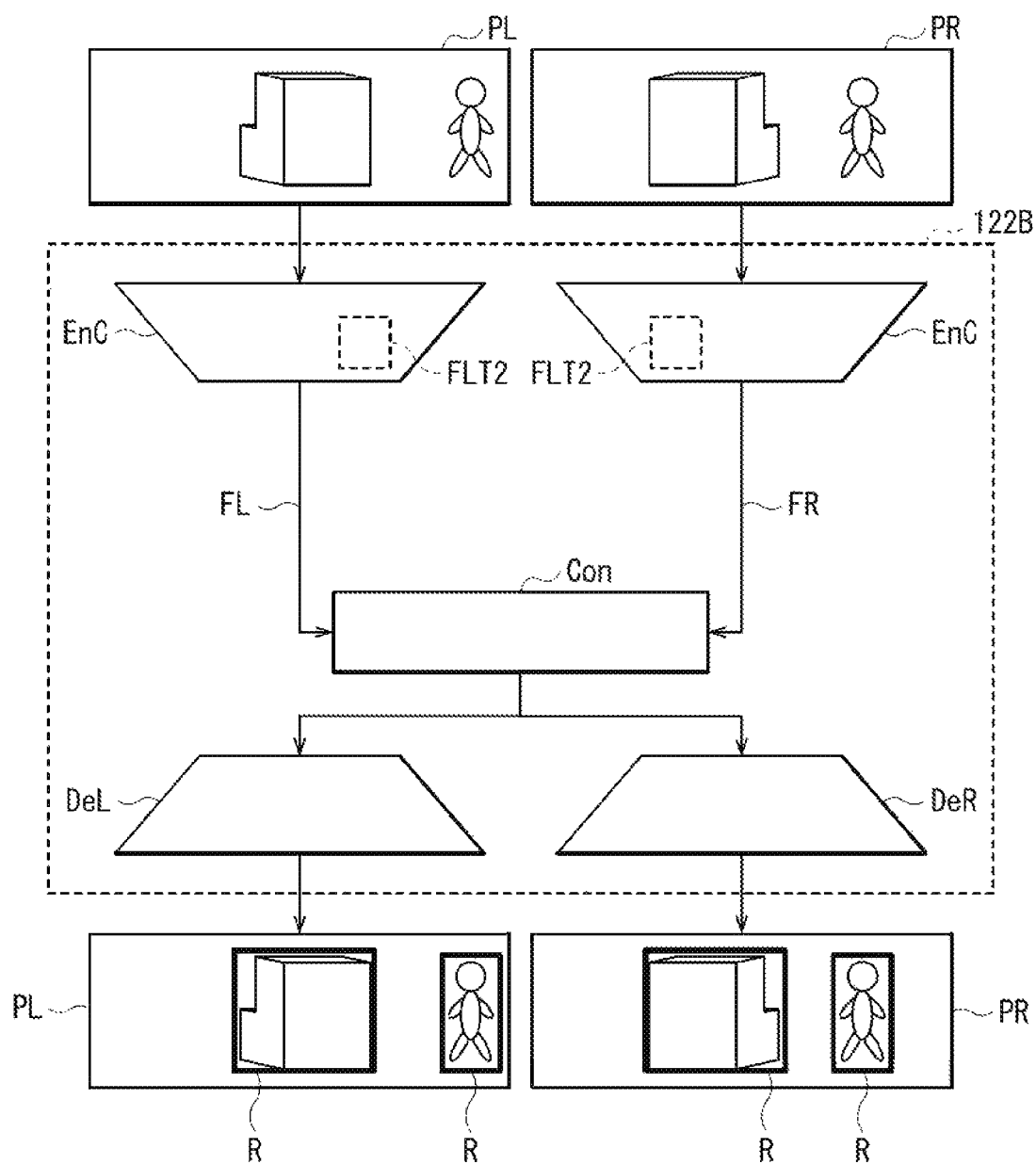
FIG. 24 is a schematic diagram illustrating a configuration example of a feature quantity extractor according to one modification example.
Figure 25:
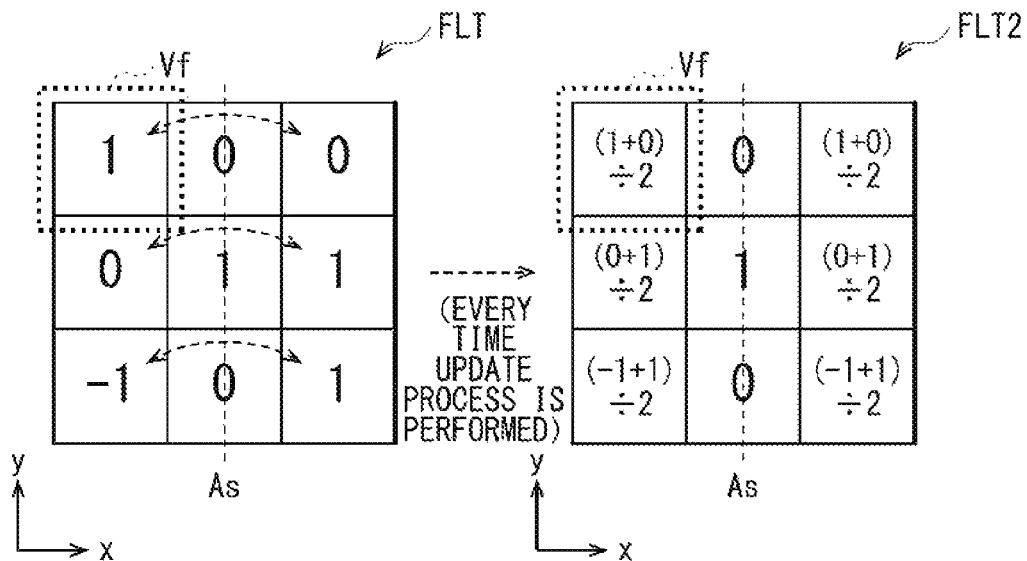
FIG. 25 is a schematic diagram illustrating another example of an update process of filter values of a filter according to one modification example.
Figure 26:
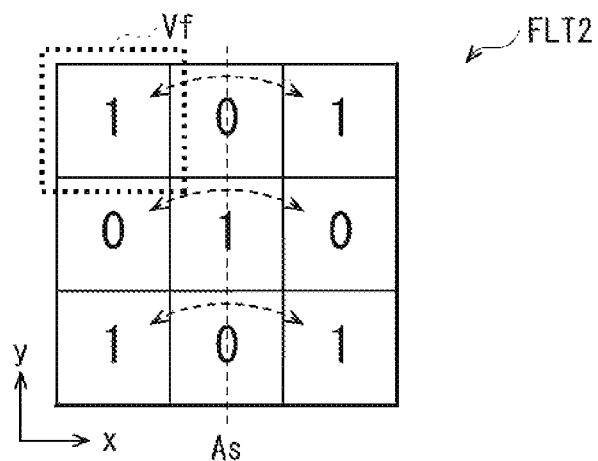
FIG. 26 is a schematic diagram illustrating a configuration example of a filter according to one modification example.

FIG. 24 schematically illustrates a configuration example (a processing example) of a feature quantity extractor 122B according to Modification Example 2. FIG. 25 schematically illustrates an example of an update process of the multiple filter values Vf of the filter FLT2 according to Modification Example 2. FIG. 26 schematically illustrates a configuration example of the filter FLT2 according to Modification Example 2.

The feature quantity extractor 122B illustrated in FIG. 24 may not include (or may omit) the two horizontally flipping processing units Fp respectively provided upstream and downstream of the encoders EnC, and may include the filter FLT2, instead of the filter FLT described above, in each of the same encoders EnC, as compared with the feature quantity extractor 122 according to the example embodiments illustrated in FIGS. 15 and 16.

For example, as illustrated in FIG. 24, the encoder EnC for the left image PL and the encoder EnC for the right image PR may be identical to each other, and each of the encoders EnC may include the filter FLT2 instead of the filter FLT described above. The filter FLT2 for the left image PL and the filter FLT2 for the right image PR may be identical to each other.

Now, with reference to FIGS. 25 and 26, a configuration example and other details of the filter FLT2 according to Modification Example 2 are described in comparison with those of the filter FLT describe above.

First, as illustrated in FIG. 25, each of the multiple filter values Vf in the filter FLT described above may be set at any value, unlike in the filter FLT2 of Modification Example 2. For example, the multiple filter values Vf in the filter FLT may not be values that are line-symmetric (horizontally symmetric) about an axis of symmetry As extending along a predetermined direction (y-axis direction in this example) (see broken-line arrows in FIG. 25).

In contrast, as illustrated in FIGS. 25 and 26, for example, each of the multiple filter values Vf in the filter FLT2 of Modification Example 2 may be set as described below, unlike in the filter FLT described above.

First, as illustrated in FIG. 26, for example, the multiple filter values Vf in the filter FLT2 of Modification Example 2 may be set at values that are line-symmetric about the axis of symmetry As described above. In this example, the line symmetry may be horizontal symmetry about the axis of symmetry As (symmetry along an x-axis direction), and the multiple filter values Vf may be set at horizontally symmetric values (see broken-line arrows in FIG. 26).

The multiple filter values Vf may be set at horizontally symmetric values as illustrated in FIG. 25, for example. That is, the update process of the filter value Vf may be executed as needed every time the filter (the filter FLT2) is updated by the machine learning described above (see FIG. 5), and the multiple filter values Vf of the filter FLT2 may thereby set at the line-symmetric (horizontally symmetric) values.

In one example, the update process of the multiple filter values Vf may be performed in the following manner as indicated by the broken-line arrows and calculating formulae (division formulae) in FIG. 25, for example. That is, the update process may be a process of updating each of every two filter values Vf located at two line-symmetric positions (horizontally symmetric positions in this example) about the axis of symmetry As described above to an average value of the two filter values Vf located at the two line-symmetric positions. Through such an update process, as illustrated in FIG. 25, for example, the configuration in which the multiple filter values Vf are not line-symmetric (the multiple filter values Vf are set at any values) as in the filter FLT described above may be updated to the filter FLT2 representing the line-symmetry described above.

Having such a configuration, the feature quantity extractor 122B makes it possible to secure the horizontal symmetry in the left feature quantity FL and the right feature quantity FR, like the feature quantity extractor 122 according to the foregoing example embodiment. That is, the horizontally symmetry between the left feature quantity FL and the right feature quantity FR is secured by setting the multiple filter values Vf of the filter FLT2 at respective values that are horizontally symmetric.

In the filter FLT2 of Modification Example 2, as described above, the multiple filter values Vf may be set at respective values that are horizontally symmetric. Accordingly, the horizontal symmetry is secured in the results of the object identification (object recognition) by the object identifier 123.

Workings and Example Effects

Also in Modification Example 2 described above, effects similar to those of the foregoing example embodiments are obtainable. That is, it is possible to secure horizontal symmetry of performance in the image processing (object recognition) based on the stereo image PIC.

In Modification Example 2, the feature quantity F (the left feature quantity FL and the right feature quantity FR) included in the stereo image PIC may be extracted by executing the convolution calculation using the filter FLT2 having the multiple filter values Vf that are arranged two-dimensionally. The multiple filter values Vf of the filter FLT2 may be set at respective values that are horizontally symmetric about the axis of symmetry As along the predetermined direction. Accordingly, horizontal symmetry is secured between the left feature quantity FL and the right feature quantity FR.

As a result, the number of parameters (the number of values represented by the filter values Vf) included in the filter FLT2 is reduced in Modification Example 2, as compared with the case of the filter FLT described above in which the multiple filter values Vf are set at any values, rather than horizontally symmetric values. For example, in the example illustrated in FIGS. 25 and 26 described above, the number of parameters in the filter FLT2 of Modification Example 2 may be reduced to about one half that in the filter FLT. Accordingly, it is possible for Modification Example 2 to achieve further lightness of a processing model (trained model) in image processing (object recognition).

Further, in Modification Example 2, the update process on the multiple filter values Vf may be executed as needed every time the filter FLT2 is updated by the machine learning as described above. As a result, the multiple filter values Vf in the filter FLT2 may be set at respective values that are horizontally symmetric. Further, in Modification Example 2, the update process on the multiple filter values Vf described above may correspond to the process of updating each of every two filter values Vf located at two horizontally symmetric positions about the axis of symmetry As to an average value of the two filter values Vf located at the two horizontally symmetric positions. Accordingly, it is possible for Modification Example 2 to easily perform the process of setting the filter values Vf at respective values that are horizontally symmetric.

In the foregoing example embodiments and Modification Examples 1 and 2, as the calculation process to secure the horizontal symmetry described above, the concatenation process may be performed to concatenate the pixel values of the added image Fs (i.e., the sum total value as a resultant of addition of the pixel values between the left feature quantity FL and the right feature quantity FR) and the pixel values of the difference image Fd (i.e., the absolute value of the difference in the pixel values between the left feature quantity FL and the right feature quantity FR).

However, in Modification Example 3, as the calculation process to secure the horizontal symmetry described above, a concatenation process of a superordinate concept (generalized concatenation process) may be performed using the added image Fs and the difference image Fd.

For example, in Modification Example 3, the calculation process to secure the horizontal symmetry described above may correspond to a process of concatenating the pixel values between the left feature quantity FL and the right feature quantity FR using one or more commutative operations. Here, the commutative operation (calculation process) may refer to an operation that satisfies $f(X,Y)=f(Y,X)$, where X and Y represent variables, and $f(X,Y)$ represents a new value calculated on the basis of X and Y. In other words, the commutative operation may refer to an operation that satisfies the commutative law.

An addition operation (f(X,Y)=X+Y) for obtaining the added image Fs described in the foregoing example embodiment and a difference absolute value operation (f(X,Y)=|X−Y|) for obtaining the difference image Fd described in the foregoing example embodiment may be each a commutative operation. Further, for example, the following Expression (3) representing multiplication, the following Expression (4) for calculating a maximum value of (X,Y), and the following Expression (5) for calculating a minimum value of (X,Y) may also each be a commutative operation.

$$f(X,Y)=X\times Y \quad \text{Expression (3)}$$

$$f(X,Y)=\max(X,Y) \quad \text{Expression (4)}$$

$$f(X,Y)=\min(X,Y) \quad \text{Expression (5)}$$

Further, for example, the following Expression (6), which is a combination of multiple commutative operations f, g, and h, may also be a commutative operation.

$$f(g(X,Y),h(X,Y)) \quad \text{Expression (6)}$$

Even in a case where the concatenation process of concatenating the pixel values between the left feature quantity FL and the right feature quantity FR is performed using one or more of the commutative operations described above, it is possible to achieve the calculation process to secure the horizontal symmetry described above. Note that examples of the commutative operations are not limited to the examples described above, and other commutative operations may be used.

Also in Modification Example 3 described above, effects similar to those of the foregoing example embodiments are obtainable. That is, it is possible to secure horizontal symmetry of performance in the image processing (object recognition) based on the stereo image PIC.

Although some example embodiments, Modification Examples, and Inventive Example (hereinafter collectively referred to as example embodiments) of the disclosure have been described hereinabove, the disclosure is not limited to those example embodiments, and various modifications may be made thereto.

For example, the configurations, including type, shape, arrangement, and the number of pieces, of respective components of the vehicle 10 and the image processing apparatus 12 are not limited to those described in the example embodiments. The configuration of each of the components may be modified by employing any other type, shape, arrangement, number of pieces, etc. In addition, values, ranges, magnitude relationships, etc., of various parameters described in the example embodiments are non-limiting, and any other values, ranges, magnitude relationships, etc. may be employed.

For example, in the example embodiments above, the stereo camera 11 may capture images of the front view from the vehicle 10; however, this is non-limiting, and the stereo camera 11 may capture images of the side view or rear view from the vehicle 10.

Further, although examples of the various processes to be performed at the vehicle 10 or the image processing apparatus 12 have been described in the example embodiments above, such examples are non-limiting, and other techniques may be used to perform those processes. For example, techniques to perform the foregoing concatenation process and update process of the filter are not limited to those described in the example embodiments above, and other techniques may be used. Further, any technique other than the technique described in the example embodiments above may be used to set the filter values at horizontally symmetric values. In addition, although an example case in which the convolution calculation is performed multiple times has been described in the example embodiments above, this is non-limiting. Alternatively, for example, the convolution calculation may be performed only once and another calculation technique may be performed in combination with the convolution calculation to thereby extract the feature quantity.

The series of processes described in the example embodiments above may be performed by hardware such as circuitry, or by software such as a program. In a case where the series of processes is to be performed by software, the software may include a group of programs for causing a computer to execute various operations. Each program may be a built-in program that is incorporated in the computer in advance for use. Each program may alternatively be installed in the computer from a network or a computer-readable medium for use, for example.

Further, although an example case in which the image processing apparatus 12 may be mounted on the vehicle has been described in the example embodiments above, this is non-limiting. Alternatively, for example, the image processing apparatus 12 may be mounted on a movable body other than a vehicle, or on equipment other than a movable body.

Furthermore, the various examples described above may be applied in any combination.

The effects described herein are mere examples and non-limiting, and other effects may be achieved.

It is possible to achieve at least the following configurations from the foregoing example embodiments of the disclosure.

(1) An image processing apparatus including:
an extractor configured to extract a left feature quantity included in a left image of a stereo image and a right feature quantity included in a right image of the stereo image by executing a convolution calculation multiple times on the basis of the left image and the right image with securing horizontal symmetry between the left feature quantity and the right feature quantity, and execute, at the convolution calculation, a concatenation process of concatenating pixel values between the left feature quantity and the right feature quantity using a calculation process to secure the horizontal symmetry; and
an object identifier configured to perform object identification of an object on the basis of the left feature quantity and the right feature quantity.

(2) The image processing apparatus according to (1) described above, in which the calculation process is a process of concatenating the pixel values between the left feature quantity and the right feature quantity using one or more commutative operations.

(3) The image processing apparatus according to (2) described above, in which the calculation process is a process of concatenating pixel values between
a sum total value as a resultant of addition of the pixel values between the left feature quantity and the right feature quantity, and
an absolute value of a difference in the pixel values between the left feature quantity and the right feature quantity.

(4) The image processing apparatus according to any one of (1) to (3) described above, in which the horizontal symmetry between the left feature quantity and the right feature quantity is secured by performing horizontally flipping processing on the pixel values of one of the left image and the right image before and after the left feature quantity and the right feature quantity are extracted.

(5) The image processing apparatus according to any one of (1) to (3) described above, in which
the extractor is configured to extract the left feature quantity and the right feature quantity by performing the convolution calculation using a filter having multiple filter values that are two-dimensionally arranged, and
the horizontal symmetry between the left feature quantity and the right feature quantity is secured by setting the multiple filter values of the filter at respective values that are horizontally symmetric.

(6) The image processing apparatus according to (5) described above, in which
the multiple filter values of the filter are set at the respective values that are horizontally symmetric through an update process on the multiple filter values executed as needed every time the filter is updated by machine learning, and
the update process is a process of updating each of every two filter values located at two horizontally symmetric positions about a predetermined axis of symmetry to an average value of the two filter values located at the two horizontally symmetric positions.

(7) The image processing apparatus according to any one of (1) to (6) described above, in which
the image processing apparatus is mountable on a vehicle, and
horizontal symmetry is secured between a result of the object identification performed by the object identifier while the vehicle is traveling in a left-side travel environment and a result of the object identification performed by the object identifier while the vehicle is traveling in a right-side travel environment.

(8) A vehicle including:
the image processing apparatus according to any one of (1) to (7) described above; and
a vehicle controller configured to control the vehicle on the basis of a result of the object identification performed by the object identifier.

(9) An image processing apparatus including
circuitry configured to
extract a left feature quantity included in a left image of a stereo image and a right feature quantity included in a right image of the stereo image by executing a convolution calculation multiple times on the basis of the left image and the right image with securing horizontal symmetry between the left feature quantity and the right feature quantity,
execute, at the convolution calculation, a concatenation process of concatenating pixel values between the left feature quantity and the right feature quantity using a calculation process to secure the horizontal symmetry, and
identify an object on the basis of the left feature quantity and the right feature quantity.

The extractor 122 and the object identifier 123 in the image processing apparatus 12 illustrated in FIG. 1 are each implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the extractor 122 and the object identifier 123 in the image processing apparatus 12 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the extractor 122 and the object identifier 123 in the image processing apparatus 12 illustrated in FIG. 1.

The invention claimed is:

1. An image processing apparatus comprising:
an extractor configured to
extract a left feature quantity included in a left image of a stereo image and a right feature quantity included in a right image of the stereo image by executing a convolution calculation multiple times on a basis of the left image and the right image with securing horizontal symmetry between the left feature quantity and the right feature quantity, and
execute, at the convolution calculation, a concatenation process of concatenating pixel values between the left feature quantity and the right feature quantity using a calculation process to secure the horizontal symmetry; and
an object identifier configured to perform object identification of an object on a basis of the left feature quantity and the right feature quantity.

2. The image processing apparatus according to claim 1, wherein the calculation process comprises a process of concatenating the pixel values between the left feature quantity and the right feature quantity using one or more commutative operations.

3. The image processing apparatus according to claim 2, wherein the calculation process comprises a process of concatenating pixel values between
a sum total value as a resultant of addition of the pixel values between the left feature quantity and the right feature quantity, and
an absolute value of a difference in the pixel values between the left feature quantity and the right feature quantity.

4. The image processing apparatus according to claim 1, wherein the horizontal symmetry between the left feature quantity and the right feature quantity is secured by performing horizontally flipping processing on the pixel values of one of the left image and the right image before and after the left feature quantity and the right feature quantity are extracted.

5. The image processing apparatus according to claim 2, wherein the horizontal symmetry between the left feature quantity and the right feature quantity is secured by performing horizontally flipping processing on the pixel values of one of the left image and the right image before and after the left feature quantity and the right feature quantity are extracted.

6. The image processing apparatus according to claim 3, wherein the horizontal symmetry between the left feature quantity and the right feature quantity is secured by performing horizontally flipping processing on the pixel values of one of the left image and the right image before and after the left feature quantity and the right feature quantity are extracted.

7. The image processing apparatus according to claim 1, wherein
the extractor is configured to extract the left feature quantity and the right feature quantity by performing the convolution calculation using a filter having multiple filter values that are two-dimensionally arranged, and
the horizontal symmetry between the left feature quantity and the right feature quantity is secured by setting the multiple filter values of the filter at respective values that are horizontally symmetric.

8. The image processing apparatus according to claim 2, wherein
the extractor is configured to extract the left feature quantity and the right feature quantity by performing the convolution calculation using a filter having multiple filter values that are two-dimensionally arranged, and
the horizontal symmetry between the left feature quantity and the right feature quantity is secured by setting the multiple filter values of the filter at respective values that are horizontally symmetric.

9. The image processing apparatus according to claim 3, wherein
the extractor is configured to extract the left feature quantity and the right feature quantity by performing the convolution calculation using a filter having multiple filter values that are two-dimensionally arranged, and
the horizontal symmetry between the left feature quantity and the right feature quantity is secured by setting the multiple filter values of the filter at respective values that are horizontally symmetric.

10. The image processing apparatus according to claim 7, wherein
the multiple filter values of the filter are set at the respective values that are horizontally symmetric through an update process on the multiple filter values executed as needed every time the filter is updated by machine learning, and
the update process comprises a process of updating each of every two filter values located at two horizontally symmetric positions about a predetermined axis of symmetry to an average value of the two filter values located at the two horizontally symmetric positions.

11. The image processing apparatus according to claim 8, wherein
the multiple filter values of the filter are set at the respective values that are horizontally symmetric through an update process on the multiple filter values executed as needed every time the filter is updated by machine learning, and
the update process comprises a process of updating each of every two filter values located at two horizontally symmetric positions about a predetermined axis of symmetry to an average value of the two filter values located at the two horizontally symmetric positions.

12. The image processing apparatus according to claim 9, wherein
the multiple filter values of the filter are set at the respective values that are horizontally symmetric through an update process on the multiple filter values executed as needed every time the filter is updated by machine learning, and
the update process comprises a process of updating each of every two filter values located at two horizontally symmetric positions about a predetermined axis of symmetry to an average value of the two filter values located at the two horizontally symmetric positions.

13. The image processing apparatus according to claim 1, wherein
the image processing apparatus is mountable on a vehicle, and
horizontal symmetry is secured between a result of the object identification performed by the object identifier while the vehicle is traveling in a left-side travel environment and a result of the object identification performed by the object identifier while the vehicle is traveling in a right-side travel environment.

14. The image processing apparatus according to claim 2, wherein
the image processing apparatus is mountable on a vehicle, and
horizontal symmetry is secured between a result of the object identification performed by the object identifier while the vehicle is traveling in a left-side travel environment and a result of the object identification performed by the object identifier while the vehicle is traveling in a right-side travel environment.

15. The image processing apparatus according to claim 3, wherein
the image processing apparatus is mountable on a vehicle, and
horizontal symmetry is secured between a result of the object identification performed by the object identifier while the vehicle is traveling in a left-side travel environment and a result of the object identification performed by the object identifier while the vehicle is traveling in a right-side travel environment.

16. A vehicle comprising:
the image processing apparatus according to claim 1; and
a vehicle controller configured to control the vehicle on a basis of a result of the object identification performed by the object identifier.

17. A vehicle comprising:
the image processing apparatus according to claim 2; and
a vehicle controller configured to control the vehicle on a basis of a result of the object identification performed by the object identifier.

18. A vehicle comprising:
the image processing apparatus according to claim 3; and
a vehicle controller configured to control the vehicle on a basis of a result of the object identification performed by the object identifier.

19. An image processing apparatus comprising
circuitry configured to
extract a left feature quantity included in a left image of a stereo image and a right feature quantity included in a right image of the stereo image by executing a convolution calculation multiple times on a basis of the left image and the right image with securing horizontal symmetry between the left feature quantity and the right feature quantity,
execute, at the convolution calculation, a concatenation process of concatenating pixel values between the left feature quantity and the right feature quantity using a calculation process to secure the horizontal symmetry, and identify an object on a basis of the left feature quantity and the right feature quantity.

* * * * *